US012567407B2

(12) United States Patent
Hertschuh et al.

(10) Patent No.: US 12,567,407 B2
(45) Date of Patent: Mar. 3, 2026

(54) USER PROFILE LINKING

(71) Applicant: Amazon Technologies, Inc., Seattle, WA (US)

(72) Inventors: Fabien Hertschuh, Seattle, WA (US); Mohit Mittal, Vancouver (CA); John Montague Howard, Seattle, WA (US); Akshit Proothi, Seattle, WA (US); Rahul Manne, Lynwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/467,083

(22) Filed: Sep. 14, 2023

(65) Prior Publication Data

US 2023/0419957 A1      Dec. 28, 2023

Related U.S. Application Data

(63) Continuation of application No. 17/405,120, filed on Aug. 18, 2021, now Pat. No. 11,810,555, which is a (Continued)

(51) Int. Cl.
| | |
|---|---|
| *G10L 15/22* | (2006.01) |
| *G10L 15/07* | (2013.01) |

(Continued)

(52) U.S. Cl.
CPC .......... *G10L 15/1822* (2013.01); *G10L 15/07* (2013.01); *G10L 15/1815* (2013.01);

(Continued)

(58) Field of Classification Search
None
See application file for complete search history.

(56) References Cited

U.S. PATENT DOCUMENTS

| | | | | |
|---|---|---|---|---|
| 7,188,252 B1 * | 3/2007 | Dunn | .................... | H04L 63/102 |
| | | | | 713/193 |
| 8,340,974 B2 * | 12/2012 | Zurek | .................... | G10L 13/00 |
| | | | | 704/270.1 |

(Continued)

*Primary Examiner* — Richard Z Zhu
(74) *Attorney, Agent, or Firm* — Pierce Atwood LLP

(57) ABSTRACT

Described are techniques for linking generating a skill-stored user profile, and linking same with a natural language processing (NLP) system-stored user profile. In at least some examples, a user may provide a natural language input to a NLP system. The NLP system may determine a skill is to process to perform an action responsive to the natural language input. To perform the action, the skill may require the user have a user profile stored by the skill, but the user may not have such a user profile. However, the NLP system may store a user profile for the user. The NLP system may determine the user profile stored thereby and may send, with user permission, information in the user profile to the skill. The skill may use the received information to generate and store a user profile for the user. Thereafter, the skill may provide the NLP system with a user profile identifier that the skill may use to identify the user's profile stored thereby. The NLP system may store the received user profile identifier in the user's profile stored by the NLP system, thereby linking the user profiles and enabling the skill to thereafter personalize processing with respect to natural language inputs of the user.

20 Claims, 17 Drawing Sheets

Related U.S. Application Data continuation of application No. 16/455,496, filed on Jun. 27, 2019, now Pat. No. 11,114,090.

(51) Int. Cl.
| | |
|---|---|
| *G10L 15/18* | (2013.01) |
| *G10L 17/00* | (2013.01) |
| *G10L 17/04* | (2013.01) |
| *G10L 17/26* | (2013.01) |

(52) U.S. Cl.
CPC .............. *G10L 15/22* (2013.01); *G10L 17/00* (2013.01); *G10L 2015/223* (2013.01); *G10L 2015/227* (2013.01); *G10L 2015/228* (2013.01); *G10L 17/04* (2013.01); *G10L 17/26* (2013.01)

(56) References Cited

U.S. PATENT DOCUMENTS

| | | | | |
|---|---|---|---|---|
| 8,682,667 | B2 * | 3/2014 | Haughay | G10L 17/08 |
| | | | | 704/251 |
| 9,858,927 | B2 * | 1/2018 | Williams | G06F 3/165 |
| 9,922,642 | B2 * | 3/2018 | Pitschel | G10L 15/063 |
| 10,074,369 | B2 * | 9/2018 | Devaraj | G10L 15/22 |
| 10,580,405 | B1 * | 3/2020 | Wang | G10L 15/30 |
| 10,621,988 | B2 * | 4/2020 | Raichelgauz | G06F 16/41 |
| 10,832,684 | B2 * | 11/2020 | Sarikaya | G10L 15/22 |
| 11,516,213 | B2 * | 11/2022 | Ding | H04L 63/0853 |
| 11,516,221 | B2 * | 11/2022 | Alsina | G06F 3/167 |
| 11,528,274 | B1 * | 12/2022 | Krishnamoorthy | H04W 12/35 |
| 11,580,973 | B2 * | 2/2023 | Sundaram | G10L 15/22 |
| 2010/0169091 | A1 * | 7/2010 | Zurek | G06Q 30/02 |
| | | | | 704/235 |
| 2012/0095834 | A1 * | 4/2012 | Doig | G06Q 30/0255 |
| | | | | 705/14.53 |
| 2012/0265528 | A1 * | 10/2012 | Gruber | G10L 15/183 |
| | | | | 704/235 |
| 2017/0242657 | A1 * | 8/2017 | Jarvis | G10L 17/22 |
| 2018/0061421 | A1 * | 3/2018 | Sarikaya | G10L 15/22 |
| 2020/0160856 | A1 * | 5/2020 | Kline | G06F 3/167 |
| 2020/0194004 | A1 * | 6/2020 | Bates | G10L 17/00 |
| 2020/0342877 | A1 * | 10/2020 | Kartoun | G06F 21/32 |
| 2020/0382517 | A1 * | 12/2020 | Alsina | H04L 63/102 |
| 2021/0084032 | A1 * | 3/2021 | Ding | G06F 9/54 |

* cited by examiner

FIG. 1A

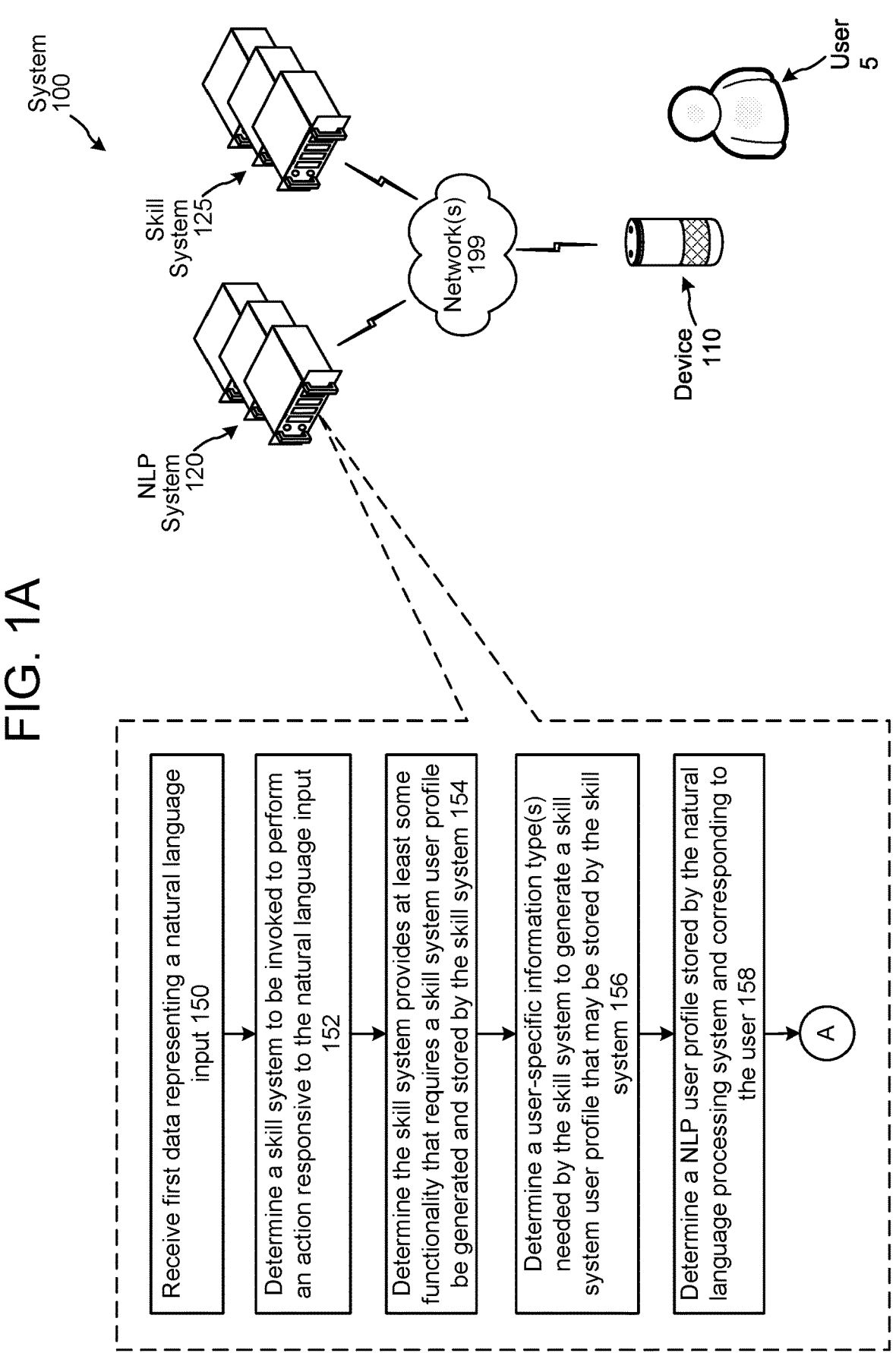

System 100

Skill System 125

NLP System 120

Network(s) 199

Device 110

User 5

Receive first data representing a natural language input 150

Determine a skill system to be invoked to perform an action responsive to the natural language input 152

Determine the skill system provides at least some functionality that requires a skill system user profile be generated and stored by the skill system 154

Determine a user-specific information type(s) needed by the skill system to generate a skill system user profile that may be stored by the skill system 156

Determine a NLP user profile stored by the natural language processing system and corresponding to the user 158

Figure 6:
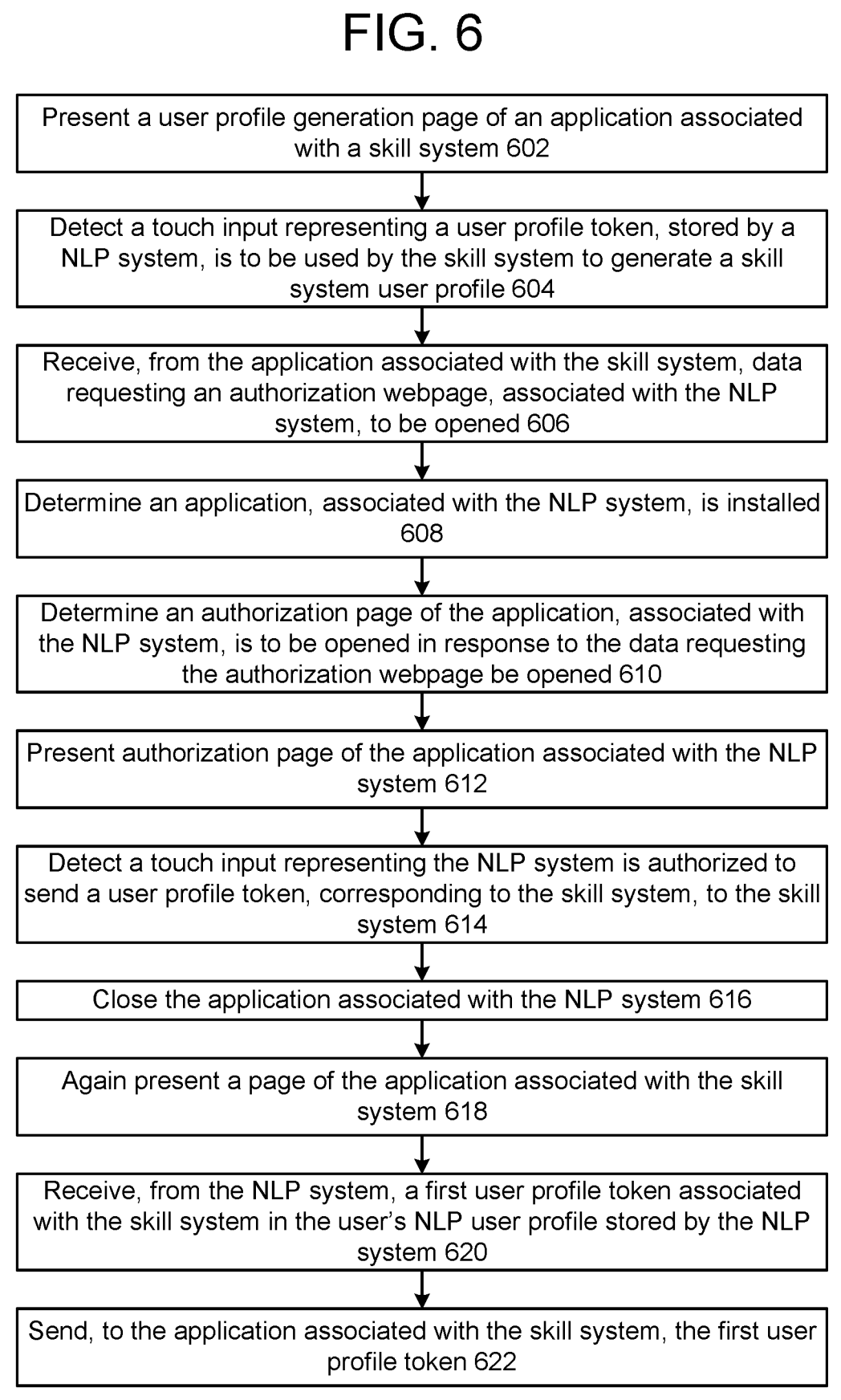

Present a user profile generation page of an application associated with a skill system 602

↓

Detect a touch input representing a user profile token, stored by a NLP system, is to be used by the skill system to generate a skill system user profile 604

↓

Receive, from the application associated with the skill system, data requesting an authorization webpage, associated with the NLP system, to be opened 606

↓

Determine an application, associated with the NLP system, is installed 608

↓

Determine an authorization page of the application, associated with the NLP system, is to be opened in response to the data requesting the authorization webpage be opened 610

↓

Present authorization page of the application associated with the NLP system 612

↓

Detect a touch input representing the NLP system is authorized to send a user profile token, corresponding to the skill system, to the skill system 614

↓

Close the application associated with the NLP system 616

↓

Again present a page of the application associated with the skill system 618

↓

Receive, from the NLP system, a first user profile token associated with the skill system in the user's NLP user profile stored by the NLP system 620

↓

Send, to the application associated with the skill system, the first user profile token 622

FIG. 7

USER PROFILE LINKING

CROSS-REFERENCE TO RELATED APPLICATIONS

This application is a continuation of, and claims the benefit of priority of U.S. Non-Provisional patent application Ser. No. 17/405,120, filed Aug. 18, 2021, and entitled "USER PROFILE LINKING," which is a continuation of, and claims the benefit of priority of, U.S. Non-Provisional patent application Ser. No. 16/455,496, filed Jun. 27, 2019, and entitled "USER PROFILE LINKING," which issued as U.S. Pat. No. 11,114,090. The contents of the above applications are hereby expressly incorporated by reference in their entireties.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 1A and 1B illustrates a system for linking a natural language processing (NLP) user profile, stored by a NLP system, with a skill system user profile stored by a skill system, in accordance with embodiments of the present disclosure.

FIG. 6 is a process flow diagram illustrating a method for linking an already existing NLP user profile token, stored by a NLP system, with a newly generated skill system user profile, in accordance with embodiments of the present disclosure.

FIG. 7 is a block diagram conceptually illustrating example components of a device, in accordance with embodiments of the present disclosure.

DETAILED DESCRIPTION

Figure 1B:
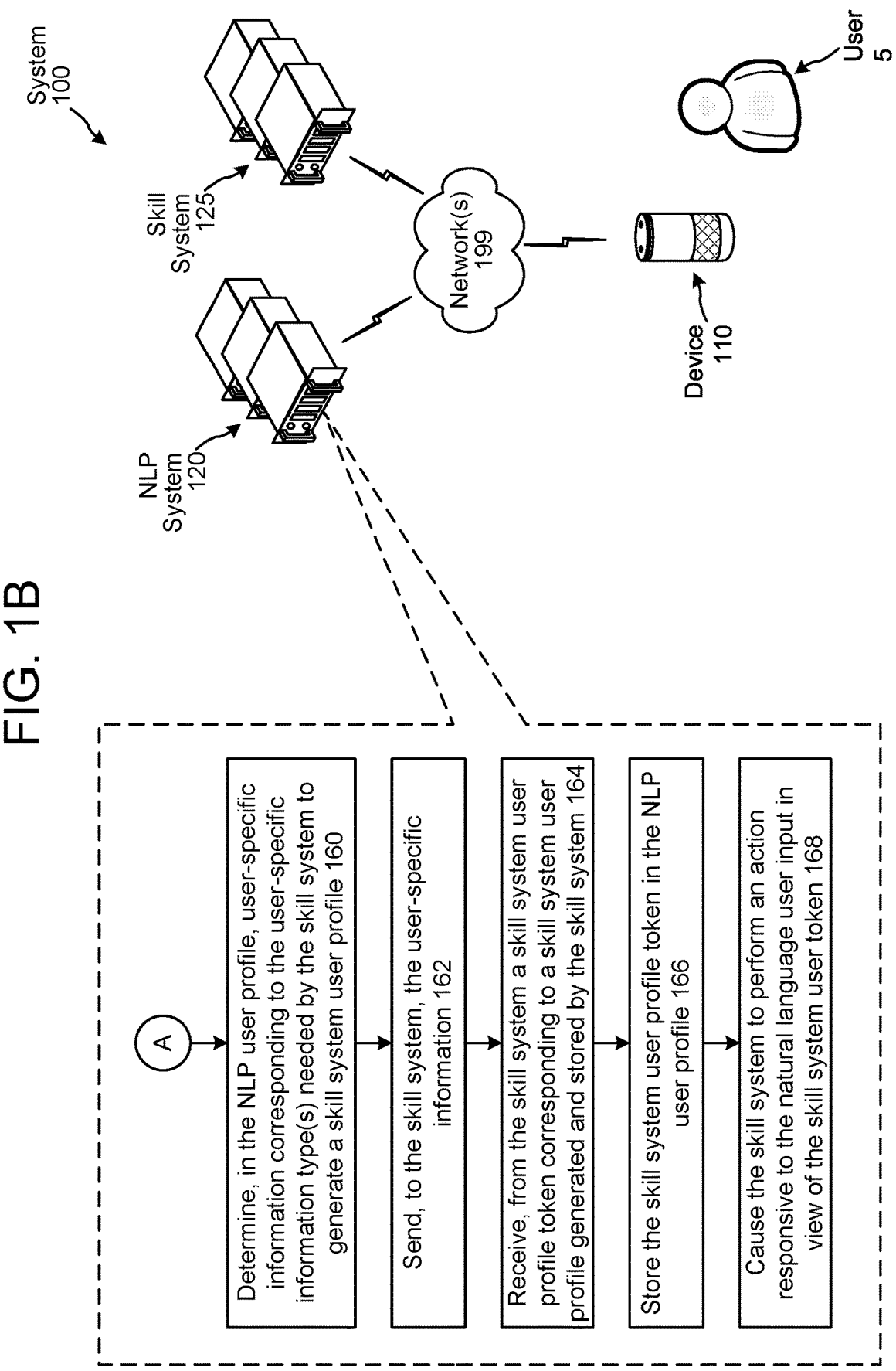

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual data into audio data that is synthesized to resemble human speech.

A NLP (NLP) system may be configured to cause skill systems to perform actions responsive to natural language inputs. For example, for the natural language input "play Adele music," a NLP system may cause a music skill system to output music sung by an artist named Adele. For further example, for the natural language input "turn on the lights," a NLP system may cause a smart home skill system to turn on "smart" lights associated with a user's profile. In another example, for the natural language input "book me a ride to my favorite restaurant," a NLP system may cause a taxi skill system to book a trip with a taxi service to the user's favorite restaurant (e.g., as represented in the user's profile), and output synthesized speech representing such booking. Actions, in the foregoing examples, correspond to the outputting of music, the turning on of "smart" lights, and the booking of the trip coupled with output of the synthesized speech. As such, as used herein, an "action" may refer to some result of a NLP system's processing.

As used herein, a "skill system" may refer to a system configured to execute specific functionality in order to provide data or produce some other output in response to a natural language input. In at least some examples, a skill system may be server-based. Example skill systems may include weather information skill systems, music playing skill systems, smart home skill systems, etc. The functionality described herein as a skill system may be referred to using many different terms, such as an action, bot, app, or the like.

A skill system may provide functionality that requires a user to have a skill system user profile. As used herein, a "skill system user profile" may be a user profile generated and stored by a skill system. A skill system may, in at least some examples, require such a skill system user profile so the skill system can process with respect to user preferences represented in the skill system user profile, maintain a processing history for the user associated with the skill system user profile, etc. For example, a taxi skill system may require a user have a skill system user profile so the taxi skill system can keep track of previous rides purchased by the user, so the taxi skill system can save ride purchasing preferences of the user, etc. For further example, a vehicle search skill system may require a user have a skill system user profile if the user wants to save one or more vehicle listings.

A skill system, which requires a user have a skill system user profile to access at least some functionality provided by the skill system, may require the skill system user profile be linked with a user profile stored by a NLP system for the user (hereinafter referred to as a "NLP user profile"). For example, a NLP system may store a NLP user profile for a user so the NLP system can personalize processing for natural language inputs of and directing outputs for the user based on user preferences stored in the user's NLP profile, such as what content the user has access to, what devices (e.g., voice input, output, and smart home devices) the user has, and contacts the user can communicate using the NLP system. A skill system may require such a NLP user profile to be associated with (e.g., store a token representing) the skill system user profile in order for the skill system to perform personalized actions in response to natural language inputs the user provides to the NLP system. As used herein, a "token" may refer to an identifier of a user profile, with the token being unique to the system that generated the token, and with the token not being fixed to the user (e.g., the token may expire).

In at least some examples, a user may cause a skill system user profile to be generated by a skill system, and then linked with a NLP user profile of the user stored by a NLP system. For example, a user may cause a skill system user profile to be generated via an Internet website associated with the skill system and/or an application associated with the skill system that is installed on a device (e.g., a smart phone, tablet, etc.) of the user. Thereafter, the user may input login credentials, associated with the user's profile stored by the skill system, to an Internet website associated with a NLP system and/or an application associated with the NLP system and installed on a device of the user. For example, an application associated with an NLP system and installed on a device of the user is the Amazon Alexa application that may be installed on a smart phone, tablet, or the like. The NLP system may then communicate the login credentials to the skill system. In response, the skill system may provide the NLP system with a skill system user profile token that the skill system may use to identify the user's profile stored thereby. The NLP system may store the received skill system user profile token in the user's NLP user profile. The foregoing may be referred to herein as the "linking" of user profiles (e.g., the linking of a skill system user profile with a NLP user profile of the same user).

The foregoing storage of the skill system user profile token in the user's NLP user profile enables the NLP system to cause the skill system to personalize processing based on the skill system user profile stored thereby. For example, a NLP system may receive a natural language input from a user. The NLP system may determine a skill system is to process to perform an action responsive to the natural language input. The NLP system may determine a NLP user profile stored by the NLP system for the user, and may determine a skill system user profile token (specific to the skill system) stored in the NLP user profile. The NLP system may send the skill system user profile token to the skill system. The skill system may use the skill system user profile token to identify the user's skill system user profile, and personalize the skill system's processing based on the identified skill system user profile. One skilled in the art will appreciate that, if the NLP user profile does not include the skill system user profile token, the skill system may not perform processing personalized for the user as the skill system may not receive data, from the NLP system, from which the skill system may identify a skill system user profile.

In at least some examples, an open standard for access delegation, such as OAuth, may be used to grant a system access to its information on other systems without divulging passwords. Such may allow a user of one system to share the user's information about their profile with another system. For example, OAuth may provide a secure delegated access to system resources on behalf of the system. More specifically, OAuth provides a process by which a first system may authorize a second system access to the first system's resources without the first system sharing its credentials. Such may be enabled through the use of tokens. A token is issued by a first system to a second system. The second system may use the token to access protected resources of the first system with the first system's approval.

The present disclosure provides alternative user profile linking techniques whereby a user does not need to interact with a skill system to generate a skill system user profile, and then link that skill system user profile with a NLP user profile of the user. In at least some examples of the present disclosure, a user may provide a natural language input to a NLP system. The NLP system may determine a skill system is to perform an action responsive to the natural language input. To perform the action, the skill system may require the user have a skill system user profile (stored by the skill system), but the user may not have such a skill system user profile. However, the NLP system may store a NLP user profile for the user. The NLP system may determine the user profile stored thereby and may send, with user permission, information in the NLP user profile to the skill system. The skill system may use the received information to generate and store a skill system user profile for the user. Thereafter, the skill system may provide the NLP system with a skill system user profile token that the skill system may use to identify the user's skill system user profile stored thereby. The NLP system may store the received skill system user profile token in the user's NLP user profile, thereby linking the user skill system and NLP profiles and enabling the skill system to thereafter personalize processing with respect to natural language inputs of the user.

The NLP system (and other systems described herein) may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIGS. 1A and 1B show a system 100 configured to link a NLP user profile, stored by a NLP system 120, with a skill system user profile stored by a skill system 125. Although the figures and discussion illustrate certain operational steps of the system 100 in a particular order, the steps described may be performed in a different order (as well as certain steps removed or added) without departing from the intent of the disclosure. As shown in FIGS. 1A and 1B, the system 100 may include a device 110 (local to a user 5), a NLP system 120, and a skill system 125 connected across one or more networks 199.

A skill developer may provide, via a device, the NLP system with various data for the purpose of getting a skill system 125 approved for use during runtime processing of the NLP system 120. As used herein, a "skill developer" may refer to a user of the NLP system 120 that has specific permissions to generate and alter data to generate and alter functionality of a skill system 125.

In at least some examples, a skill developer may provide the NLP system 120 with data representing one or more runtime functionalities supported by the skill system 125. In at least some examples, there may be a one-to-one relationship between a runtime functionality and an action that may be performed in response to a natural language input.

In at least some examples, a skill developer may provide the NLP system 120 with data representing one or more of the one or more supported runtime functionalities require a skill system user profile. In at least some examples, the data, representing the one or more runtime functionalities that require a skill system user profile, may be generated in response to the skill developer activating a flag (or other indicator) presented to the skill developer via a graphical user interface.

In at least some examples, a skill developer may provide the NLP system 120 with data representing one or more NLU intents, executable by the skill system 125, that require a skill system user profile. For example, a skill developer may activate, with respect to the one or more NLU intents, a flag (or other indicator), presented to the skill developer via a graphical user interface, representing the one or more NLU intents require a skill system user profile.

In at least some examples, a skill developer may provide the NLP system 120 with data representing one or more types of user-specific information needed by the skill system 125 for the skill system 125 to be able to generate a skill system user profile. The user-specific information type(s) may include, for example, a user name, email address, phone number, address, and/or payment information.

After the NLP system 120 receives the foregoing data from the skill developer (and more particularly a device of the skill developer), the NLP system 120 may approve the skill system 125 for runtime processing of natural language inputs. After the NLP system 120 approves the skill system 125 for runtime processing of natural language inputs, the device 110 may receive audio corresponding to a spoken natural language input of the user 5. The device 110 may generate audio data representing the audio and may send the audio data to the NLP system 120. Alternatively, the device 110 may receive text corresponding to a typed natural language input of the user 5. The device 110 may generate text data representing the text and may send the text data to the NLP system 120. In at least some examples, the device 110 may send the audio data or text data to the NLP system 120 using an application associated with the NLP system 120 and installed on the device 110. An example of such an application is the Amazon Alexa application that may be installed on a smart phone, tablet, or the like.

The NLP system 120 may receive (150) first data (e.g., audio data or text data from the device 110) representing the natural language input of the user 5. In the example where the NLP system 120 receives audio data from the device 110, the NLP system 120 may perform speech processing with respect to the audio data to generate NLU results data. In the example where the NLP system 120 receives text data, the NLP system 120 may perform NLU processing with respect to the text data to generate NLU results data.

The NLP system 120 may, based at least in part on NLU results data, determine (152) a skill system 125 to be invoked to perform an action responsive to the natural language input. The NLP system 120 may determine (154) the skill system 125 provides at least some functionality that requires a skill system user profile be generated and stored by the skill system 125.

The NLP system 120 may determine (156) one or more types of user-specific information needed by the skill system 125 to generate a skill system user profile that may be stored by the skill system 125. The NLP system 120 may additionally determine (158) a NLP user profile stored by the NLP system 120 and corresponding to the user 5. The NLP user profile may include various information provided by and specific to the user, such as, but not limited to, an email address, a phone number, an address, and the like.

The NLP system 120 determine (160), in the NLP user profile, user-specific information corresponding to the user-specific information type(s) needed by the skill system 125 to generate a skill system user profile. For example, if the skill system 125 requires an email address, the NLP system 120 may determine an email address represented in the NLP user profile.

The NLP system 120 may determine the user has provided permission to send the user-specific information to the skill system 125. In at least some examples, when the user 5 provided user-specific information to the NLP system 120 for storage in the NLP user profile, the user 5 may have provided the NLP system 120 with permission to send the user's user-specific information to skill systems the user has enabled with respect to the NLP user profile (e.g., skill systems the user has indicated are permitted to be invoked to perform actions responsive to natural language inputs of the user 5). In such examples, determining the user has provided permission may include determining data, represented in the NLP user profile, representing the user has already provided the NLP system 120 with permission to send the user's user-specific information to skill systems the user has enabled.

In at least some other examples, the user 5 may not have provided the NLP system 120 with such permission and the NLP system 120 may determine such data is not present in the NLP user profile. In such examples, the NLP system 120 may send, to the device 110, data requesting user permission to send the user-specific information to the skill system 125. The user 5 may provide such permission by speaking the permission in the form of a spoken natural language input, by typing the permission in the form of a text natural language input, by selecting a button presented on a display screen of the device 110, etc. The device 110 may send data, representing the user's permission, to the NLP system 120.

After the NLP system 120 determines the data represented in the NLP user profile, or receives the data from the device 110, the NLP system 120 may send (162), to the skill system 125, the user-specific information. The skill system 125 may use the received user-specific information to generate a skill system user profile for the user 5, whereby the skill system user profile is stored by the skill system 125.

The skill system 125 may generate a skill system user profile token. The skill system user profile token may, in at least some examples, not directly correspond to the skill system user profile. In other words, the skill system 125 may determine the skill system user profile by decoding the skill system user profile token, but the skill system user profile token may not be the identifier used by the skill system 125 to track processing performed with respect to the skill system user profile. The skill system 125 may send the skill system user profile token to the NLP system 120.

After the NLP system 120 receives (164) the skill system user profile token from the skill systems 125, the NLP system 120 may store (166) the skill system user profile token in the NLP user profile. In at least some examples, the NLP system 120 may associate the skill system user profile token with a skill system identifier (corresponding to the skill system storing the skill system user profile) in the NLP user profile.

After the NLP system 120 stores the skill system user profile token in the NLP user profile, the NLP system 120 may cause (168) the skill system 125 to perform an action responsive to the natural language input (received at step 150) in view of the skill system user profile. Such causing may include the NLP system 120 sending, to the skill system 125, NLU results data, representing the natural language input, and the skill system user profile token.

Figure 2:
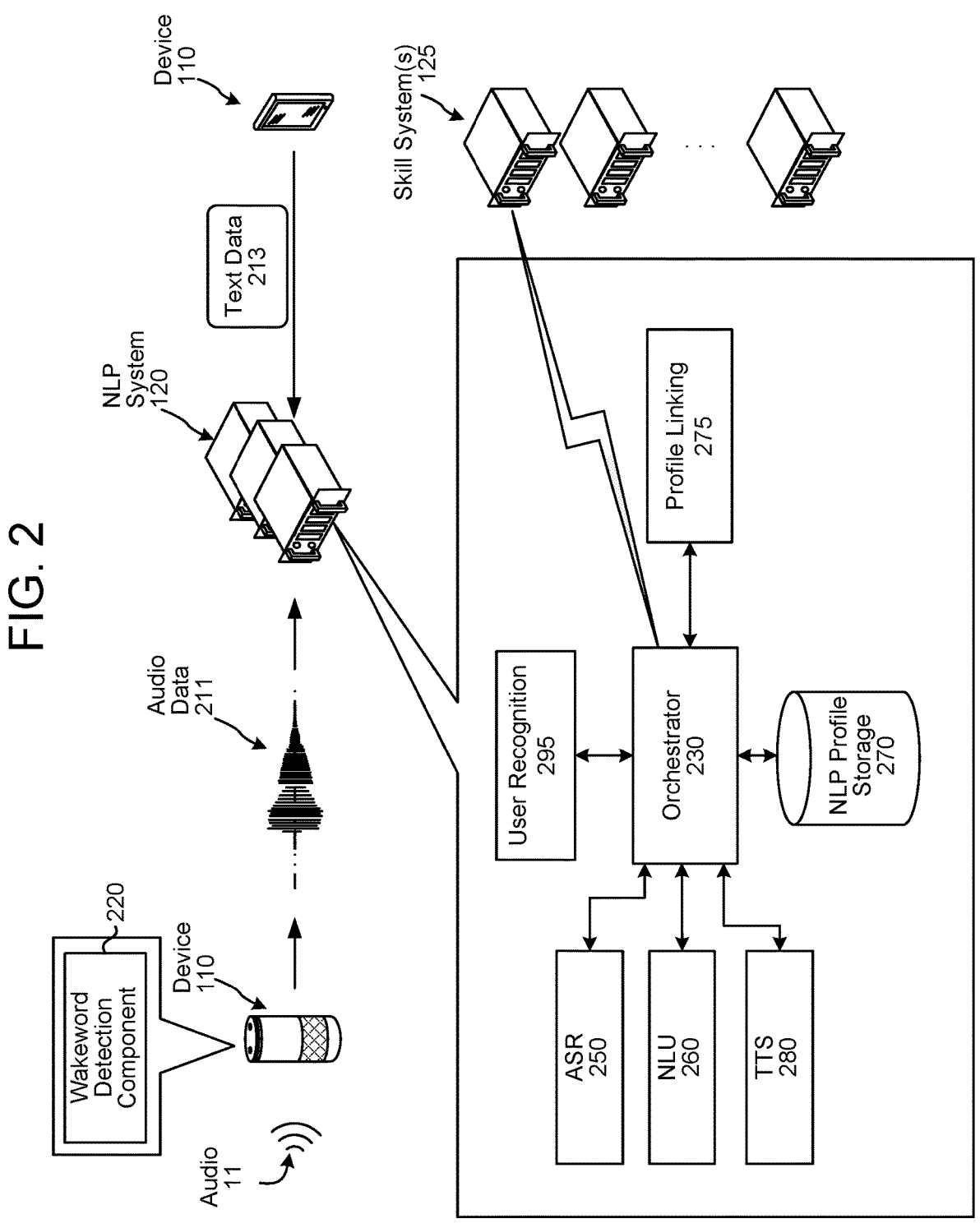
FIG. 2 is a conceptual diagram of components of a system, in accordance with embodiments of the present disclosure.
Figure 3A:
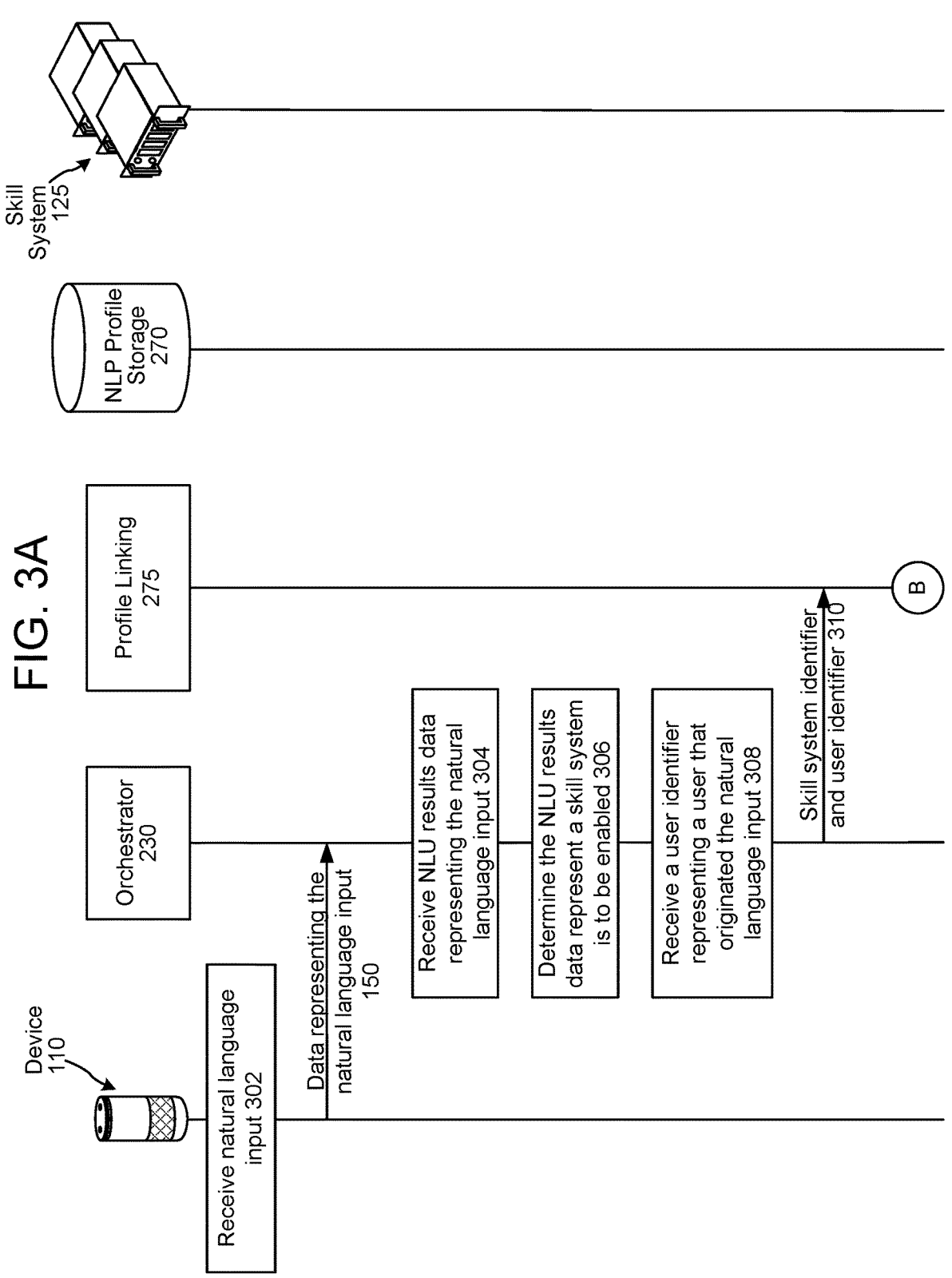
FIGS. 3A through 3F are a signal flow diagram illustrating that a skill system may generate a skill system user profile, and the skill system user profile may be linked to a NLP user profile stored by a NLP system, when a user provides a natural language input instructing the NLP system to enable the skill system, in accordance with embodiments of the present disclosure.
Figure 3B:
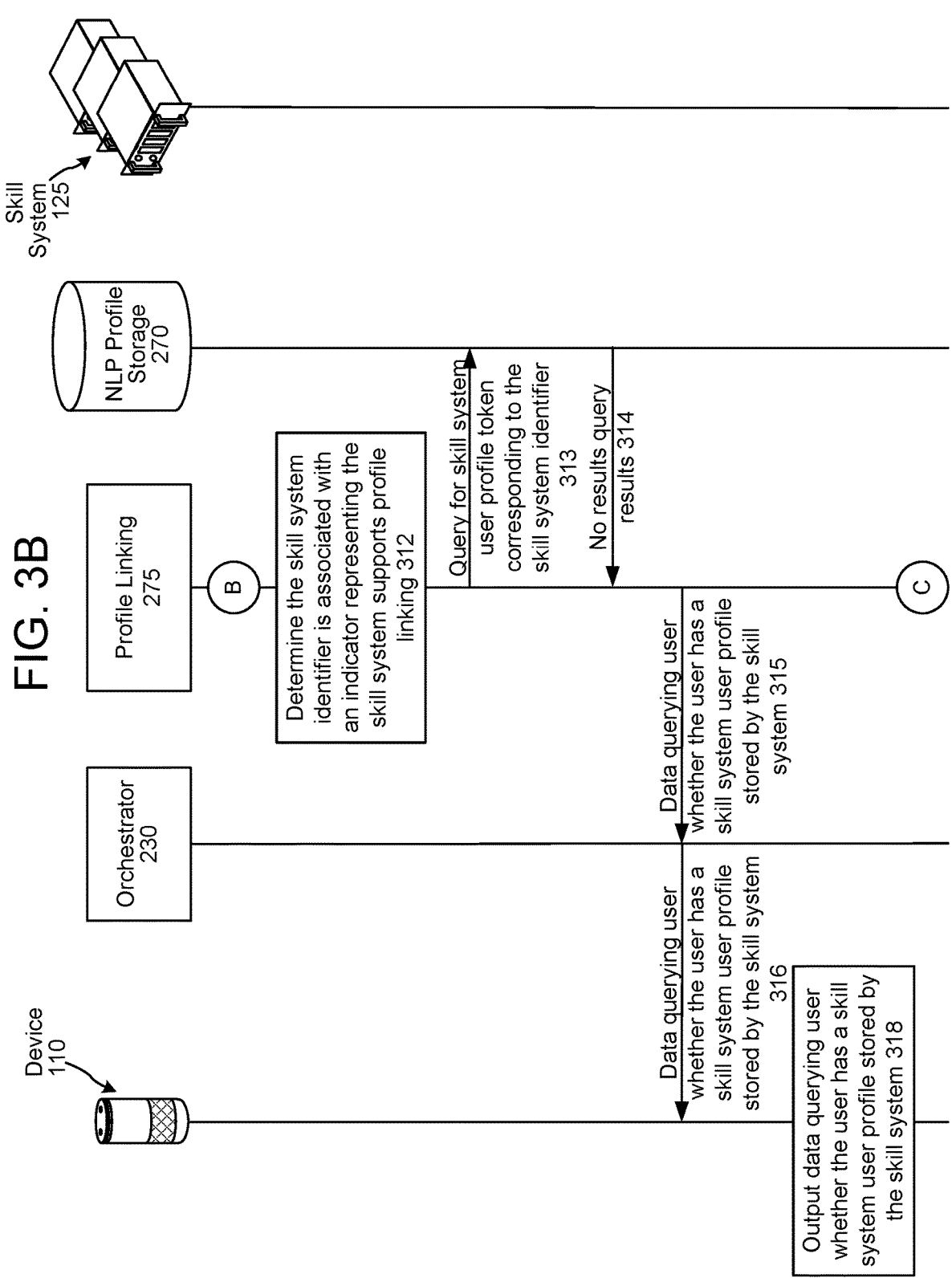
Figure 3C:
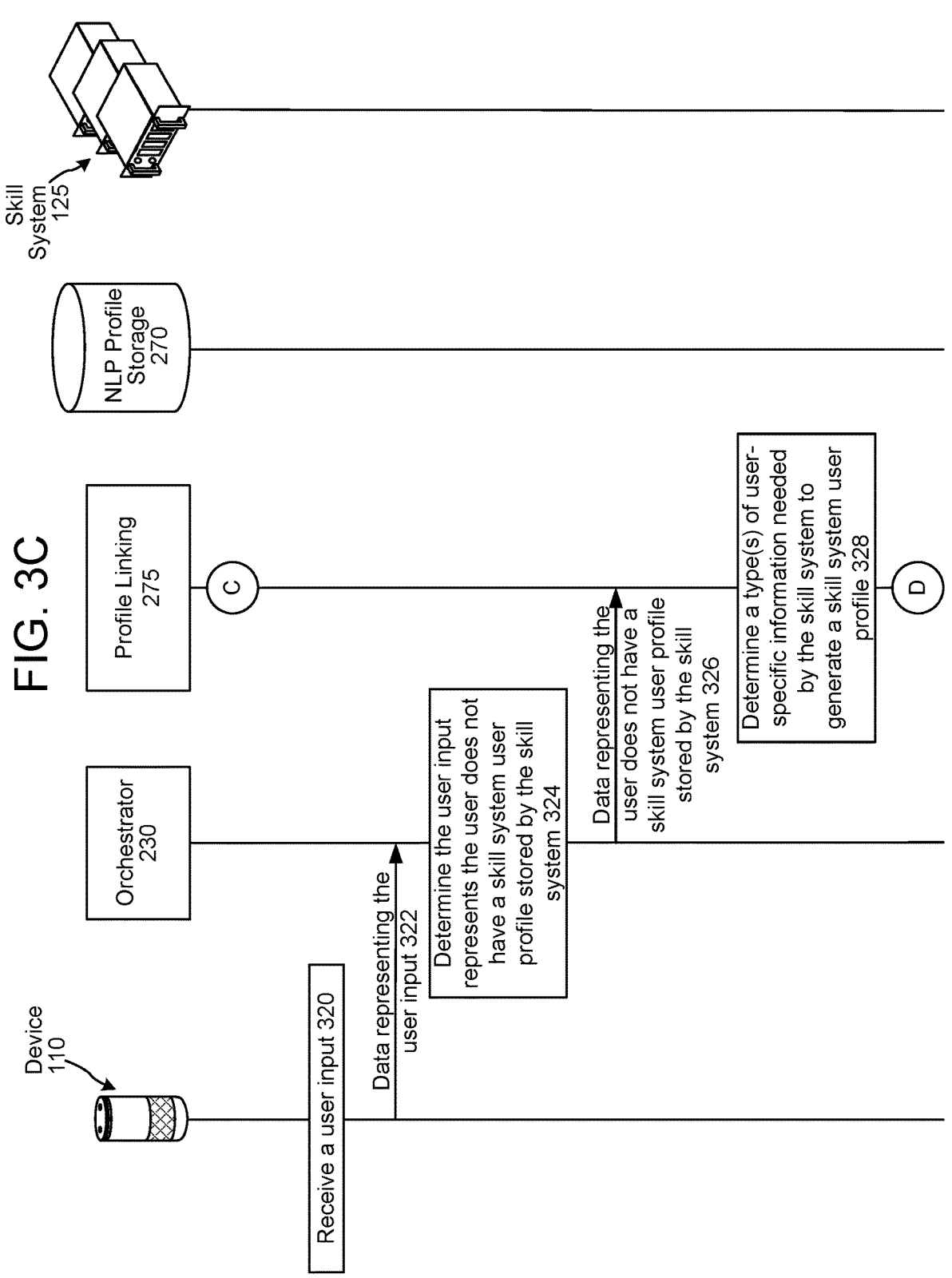
Figure 3D:
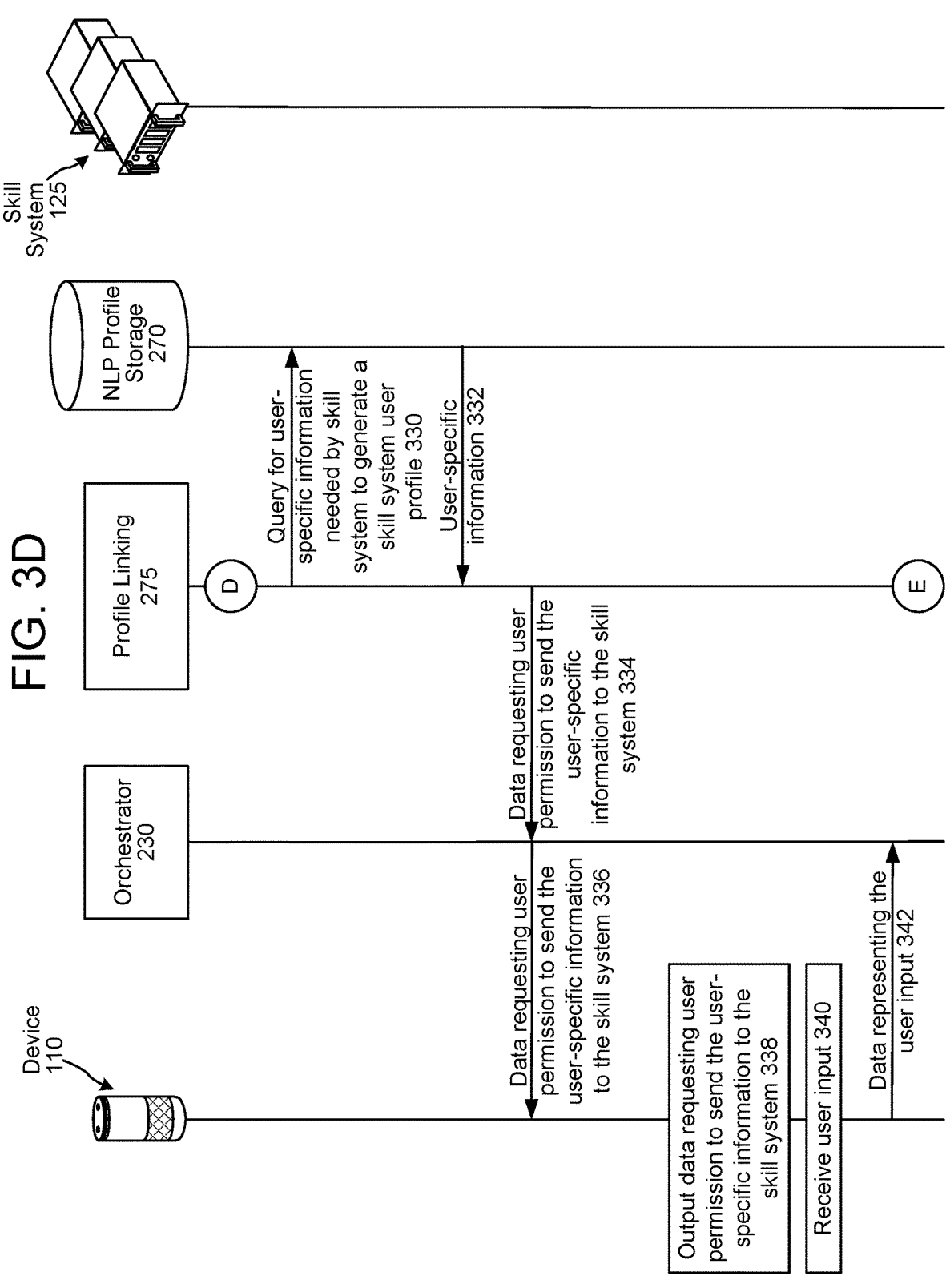
Figure 3E:
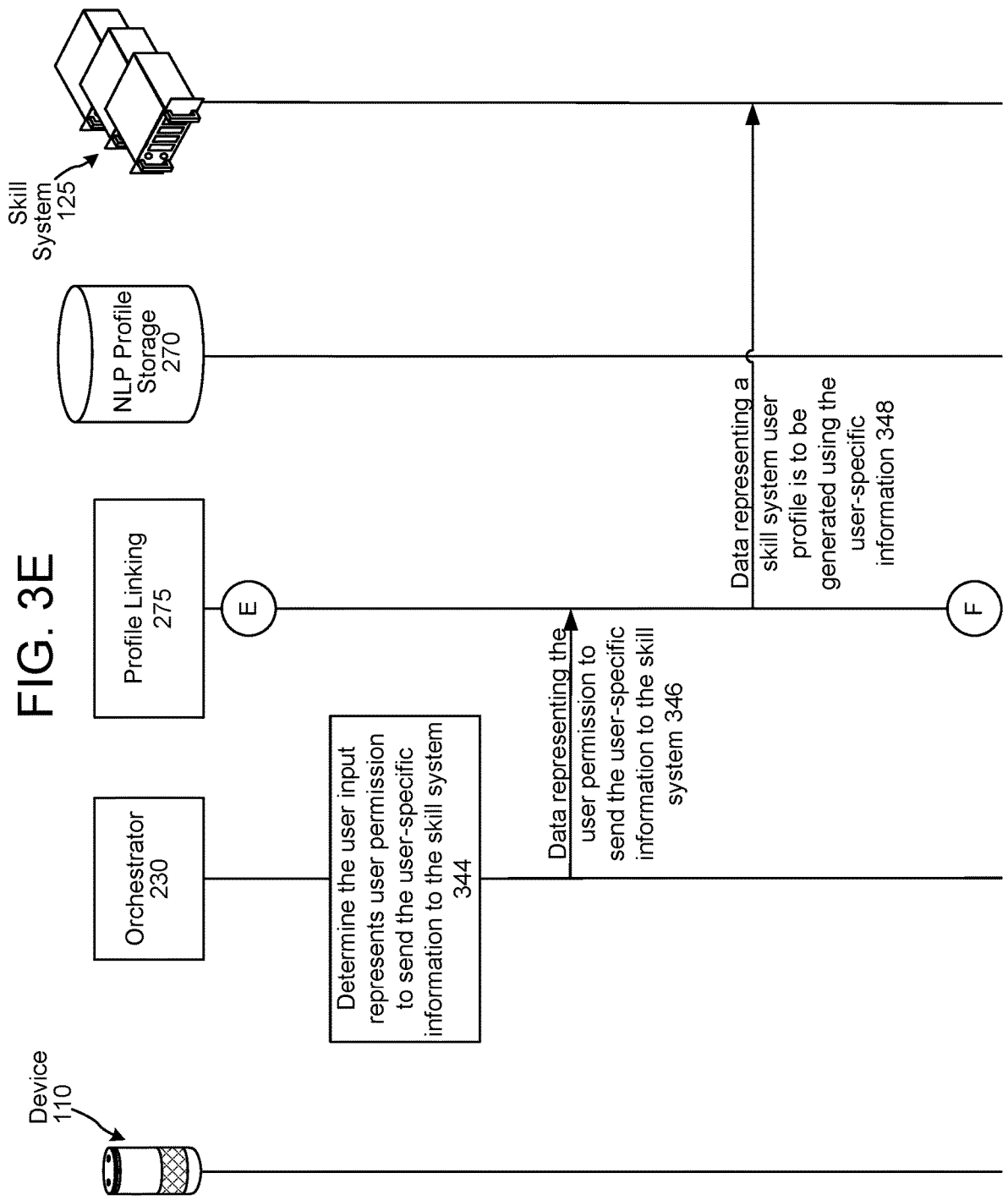
Figure 3F:
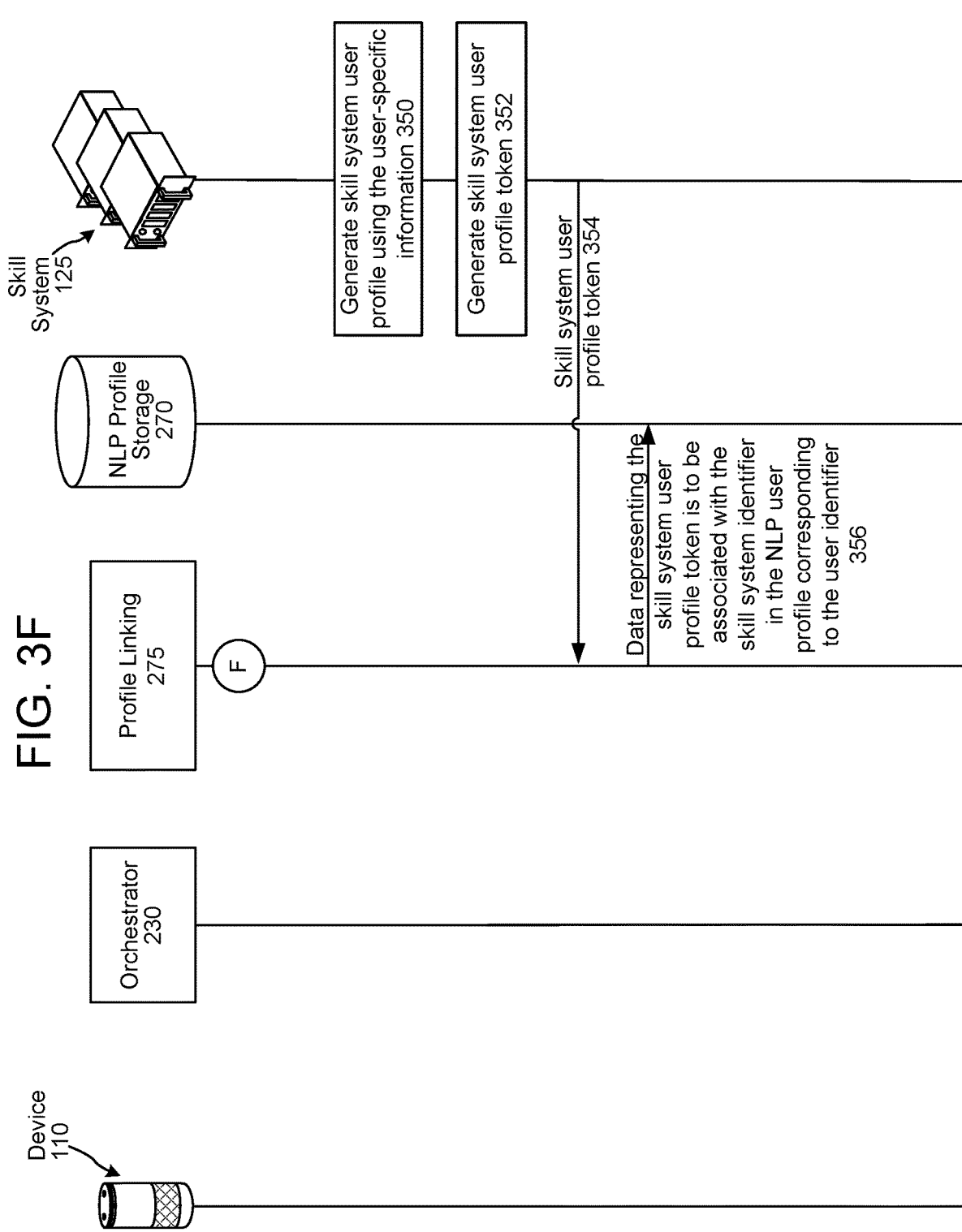

FIG. 2 conceptually illustrates various components of the system 100. The various components may be located on same or different physical devices. Communication between various components may occur directly or across a network(s) 199.

An audio capture component(s), such as a microphone or array of microphones of the device 110, captures audio 11. The device 110 processes audio data, representing the audio 11, to determine whether speech is detected. The device 110 may use various techniques to determine whether audio data includes speech. In at least some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In at least some other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the NLP system 120. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

The wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the NLP system 120. The audio data 211 may include data corresponding to the wakeword, or the device 110 may remove the portion of the audio corresponding to the wakeword prior to sending the audio data 211 to the NLP system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 may send the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110 may alternatively receive a typed natural language input. The device 110 may generate text data 213 representing the typed natural language input. The device 110 may send the text data 213 to the NLP system 120. The orchestrator component 230 may receive the text data 213.

The orchestrator component 230 may send text data (e.g., text data output by the ASR component 250 or the received text data 213) to an NLU component 260. The NLU component 260 attempts to make a semantic interpretation of the phrase(s) or statement(s) represented in the received text data. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the NLP system 120, a skill system 125, etc.) to execute the intent. For example, if the text data corresponds to "play Adele music," the NLU component 260 may determine an intent that the NLP system 120 output music and may identify "Adele" as an artist. For further example, if the text data corresponds to "what is the weather," the NLU component 260 may determine an intent that the NLP system 120 output weather information associated with a geographic location of the device 110. In another example, if the text data corresponds to "turn off the lights," the NLU component 260 may determine an intent that the NLP system 120 turn off lights associated with the device 110 or the user's profile. The NLU component 260 may output NLU results data (which may include tagged text data, indicators of intent, etc.).

As described above, the NLP system 120 may perform speech processing using two different components (e.g., the ASR component 250 and the NLU component 260). One skilled in the art will appreciate that the NLP system 120, in at least some examples, may implement a spoken language understanding (SLU) component that is configured to process the audio data 211 to generate NLU results data.

In some examples, the SLU component may be equivalent to the ASR component 250 and the NLU component 260. For example, the SLU component may process the audio data 211 and generate NLU results data. The NLU results data may include intent data and/or slot data. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take the audio data 211 representing natural language speech and attempt to make a semantic interpretation of the natural language speech. That is, the SLU component may determine a meaning associated with the natural language speech and then implement that meaning. For example, the SLU component may interpret the audio data 211 representing natural language speech from the user 5 in order to derive an intent or a desired action or operation from the user 5. In some examples, the SLU component outputs a most likely NLU hypothesis recognized in the audio data 211, or multiple NLU hypotheses in the form of an N-best list with individual NLU hypotheses corresponding to confidence scores or other scores (such as probability scores, etc.).

The NLP system 120 may communicate with one or more skill systems 125. A skill system 125 may operate in conjunction with the NLP system 120 and other devices in order to complete certain functions. Inputs to a skill system 125 may come from speech processing interactions or through other interactions or input sources.

A skill system 125 may be associated with one or more domains, such as smart home, music, video, flash briefing, shopping, and custom (e.g., a skill not associated with any preconfigured domain).

The NLP system 120 may include a TTS component 280. The TTS component 280 may generate audio data (e.g., synthesized speech) from text data using one or more different methods. Text data input to the TTS component 280 may come from a skill system 125, the orchestrator component 230, or another component of the NLP system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The NLP system 120 may include a user recognition component 295 that recognizes one or more users associated with data input to the NLP system 120. The user recognition component 295 may take as input the audio data 211 and/or the text data 213. The user recognition component 295 may perform user recognition by comparing speech characteristics in the audio data 211 to stored speech characteristics of users. The user recognition component 295 may additionally or alternatively perform user recognition by comparing biometric data (e.g., fingerprint data, iris data, etc.), received by the NLP system 120 in correlation with a user input, to stored biometric data of users. The user recognition component 295 may additionally or alternatively perform user recognition by comparing image data (e.g., including a representation of at least a feature of a user), received by the NLP system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the natural language input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the NLP system 120 and/or other systems.

The NLP system 120 may include NLP profile storage 270. The NLP profile storage 270 may include a variety of information related to individual users, groups of users, devices, etc. that interact with the NLP system 120. A "NLP profile" refers to a set of data associated with a user, group of users, device, etc. The data of a NLP profile may include preferences specific to the user, group of users, device, etc.; input and output capabilities of one or more devices; internet connectivity information; user bibliographic information; subscription information; one or more email addresses; one or more phone numbers; a user name; an address; as well as other information.

The NLP profile storage 270 may include one or more NLP user profiles, with each NLP user profile being associated with a different user identifier. Each NLP user profile may include various user identifying information. Each NLP user profile may also include preferences of the user and/or one or more device identifiers, representing one or more devices registered to the user. Each NLP user profile may include identifiers of skill systems that the user has enabled. When a user enables a skill system, the user is providing the NLP system 120 with permission to allow the skill system to execute with respect to the user's inputs. If a user does not enable a skill system, the NLP system 120 may not permit the skill system to execute with respect to the user's inputs. A NLP user profile may include a skill system user profile token, associated with a skill system identifier, corresponding to a skill system user profile of the user as stored by a skill system.

The NLP profile storage 270 may include one or more NLP group profiles. Each NLP group profile may be associated with a different NLP group profile identifier. A NLP group profile may be specific to a group of users. That is, a NLP group profile may be associated with two or more individual NLP user profiles. For example, a NLP group profile may be a NLP household profile that is associated with NLP user profiles associated with multiple users of a single household. A NLP group profile may include preferences shared by all the NLP user profiles associated therewith. Each NLP user profile associated with a NLP group profile may additionally include preferences specific to the user associated therewith. That is, each NLP user profile may include preferences unique from one or more other NLP user profiles associated with the same NLP group profile. A NLP user profile may be a stand-alone NLP user profile or may be associated with a NLP group profile. A NLP group profile may include one or more device profiles representing one or more devices associated with the NLP group profile.

The NLP profile storage 270 may include one or more device profiles. Each device profile may be associated with a different device identifier. Each device profile may include various device identifying information. Each device profile may also include one or more user identifiers, representing one or more user profiles associated with the device profile (e.g., representing one or more users that can use the device). For example, a household device's profile may include the user identifiers of users of the household.

In at least some examples, a skill system user profile may be generated by a skill system and linked with a NLP user profile stored in the NLP profile storage 270 when a user provides a natural language input instructing the NLP system 120 to enable the skill system with respect to the user's NLP user profile stored in the NLP profile storage 270. In other words, a skill system user profile may be generated by a skill system and linked with a NLP user profile stored in the NLP profile storage 270 prior to a user causing the skill system to be invoked a first time.

As illustrated in FIGS. 3A through 3F, the device 110 may receive (302) a natural language input. The device 110 may receive the natural language input as audio corresponding to a spoken natural language input. Alternatively, the device 110 may receive the natural language input as text corresponding to a typed natural language input.

The device 110 may send (150), to the orchestrator component 230 of the NLP system 120, data representing the natural language input. For example, if the device 110 receives the natural language input as audio, the data may be audio data. For further example, if the device 110 receives the natural language input as text, the data may be text data.

The orchestrator component 230 may receive (304) NLU results data representing the natural language input. For example, if the orchestrator component 230 receives audio data at step 150, the orchestrator component 230 may send the audio data to the ASR component 250. The ASR component 250 may generate text data representing the audio data and may send the text data to the orchestrator component 230. The orchestrator component 230 may send the text data to the NLU component 260. The NLU component 260 may generate NLU results data representing the text data and may send the NLU results data to the orchestrator component 230. For further example, if the orchestrator component 230 receives text data at step 150, the orchestrator component 230 may send the text data to the NLU component 260. The NLU component 260 may generate NLU results data representing the text data and may send the NLU results data to the orchestrator component 230. In another example, if the orchestrator component 230 receives audio data at step 150, the orchestrator component 230 may send the audio data to an SLU component. The SLU component may generate NLU results data representing the natural language input in the audio data and may send the NLU results data to the orchestrator component 230.

The orchestrator component 230 may determine (306) the NLU results data represent a skill system 125 is to be enabled. For example, such determination may be based on the NLU results data including an <Enable> intent and a tagged portion of text corresponding to a skill system name.

The orchestrator component 230 may receive (308) a user identifier representing a user that originated the natural language input. For example, the orchestrator component 230 may receive the user identifier from the user recognition component 295. In examples where the orchestrator component 230 receives multiple user identifiers, associated with respective scores, from the user recognition component 295, the orchestrator component 230 may determine the user identifier associated with the greatest score.

The orchestrator component 230 may send (310) a skill system identifier (corresponding to the skill system 125 to be enabled) and the user identifier (e.g., either the single received user identifier or the received top scoring user identifier) to a profile linking component 275 of the NLP system 120. In at least some examples, the orchestrator component 230 may send the skill system identifier and the user identifier to the profile linking component 275 in a single data packet. In at least some other examples, the orchestrator component 230 may send the skill system identifier and the user identifier to the profile linking component 275 separately (e.g., in different data packets).

The profile linking component 275 may determine (312) the skill system identifier is associated with an indicator representing the skill system 125 supports profile linking. As described above, a skill developer may provide the NLP system 120 with data representing one or more runtime functionalities require a skill system user profile. When approving the skill system 125 for runtime processing of natural language inputs, the NLP system 120 may generate a skill system manifest for the skill system. As used herein, a "skill system manifest" may refer to stored associations between a skill system identifier (of a skill system 125) and data provided by a skill developer with respect to the skill system 125. In at least some examples, determining that the skill system identifier is associated with the indicator may include the profile linking component 275 querying a skill system manifest storage for an indicator, representing a skill system 125 supports profile linking, associated with the skill system identifier (received at step 310). In response, the profile linking component 275 may receive query results representing the skill system identifier is associated with the indicator in the skill system manifest storage. In at least some other examples, the profile linking component 275 may determine the skill system 125 supports profile linking based on NLP user profiles, of other users of the NLP system 120, including the skill system identifier (received at step 150) associated with one or more skill system user profile tokens (representing other users of the NLP system 120 have skill system user profiles stored by the skill system 125 and linked to the users' NLP system 120 stored NLP user profiles).

The profile linking component 275 may, in at least some examples after determining the skill system 125 supports profile linking, query (313) the NLP profile storage 270 for a skill system user profile token associated with the skill system identifier in a NLP user profile corresponding to the user identifier. In at least some examples, the profile linking component 275 may receive (314) "no results" query results representing no such data is represented in the NLP user profile. In response to receiving such query results, the profile linking component 275 may send (315), to the orchestrator component 230, data querying the user whether the user has a skill system user profile stored by the skill system 125. The orchestrator component 230 may send (316), to the device 110, data querying the user whether the user has a skill system user profile stored by the skill system 125. The data sent by the orchestrator component 230 to the device 110 may be the data the orchestrator component 230 received from the profile linking component 275, or may be a representation of the data received from the profile linking component 275. For example, a representation may be TTS component output audio data (e.g., synthesized speech) representing text data the orchestrator component 230 received from the profile linking component 275.

The device 110 may output (318) the data querying the user whether the user has a skill system user profile stored by the skill system 125. In response, the device 110 may receive (320) a user input and send (322), to the orchestrator component 230, data representing the user input. In at least some examples, the user input may be a spoken natural language input, in which examples the data sent to the orchestrator component 230 may be audio data. In at least some examples, the user input may be a typed natural language input, in which examples the data sent to the orchestrator component 230 may be text data. In at least some examples, the user input may be the selection of a button presented on a display of the device 110, in which examples the data sent to the orchestrator component 230 may be text data representing the selected button. In at least some examples, the user input may be a gesture (e.g., such as the user shaking their head yes or no), in which examples the data sent to the orchestrator component 230 may be video data corresponding to images consecutively captured by a camera associated with the device 110.

The orchestrator component 230 may determine (324) the user input represents the user does not have a skill system user profile stored by the skill system 125. Such determination may depend on the data the orchestrator received from the device 110 at step 322. For example, if the orchestrator component 230 receives audio data at step 150, the orchestrator component 230 may send the audio data to the ASR component 250. The ASR component 250 may generate text data representing the audio data and may send the text data to the orchestrator component 230. The orchestrator component 230 may send the text data to the NLU component 260. The NLU component 260 may generate NLU results data representing the text data and may send the NLU results data to the orchestrator component 230. For further example, if the orchestrator component 230 receives text data at step 150, the orchestrator component 230 may send the text data to the NLU component 260. The NLU component 260 may generate NLU results data representing the text data and may send the NLU results data to the orchestrator component 230. In another example, if the orchestrator component 230 receives audio data at step 150, the orchestrator component 230 may send the audio data to an SLU component. The SLU component may generate NLU results data representing the natural language input in the audio data and may send the NLU results data to the orchestrator component 230. The orchestrator component 230, in the foregoing examples, may determine the NLU results data represents the user does not have a skill system user profile stored by the skill system 125. In another example, if the orchestrator component 230 receives video data at step 322, the orchestrator component 230 (or another component of the NLP system 120) may perform machine vision processing to determine the gesture, and determine the gesture corresponds to a user input representing the user does not have a skill system user profile stored by the skill system 125. After the orchestrator component 230 determines the user input represents the user does not have a skill system user profile stored by the skill system 125, the orchestrator component 230 may send (326), to the profile linking component 275, data representing the user does not have a skill system user profile stored by the skill system 125.

After receiving the data representing the user does not have a skill system user profile stored by the skill system 125, the profile linking component 275 may determine (328) a type(s) of user-specific information needed by the skill system 125 so that the skill system 125 can generate a skill system user profile. As described above, a skill developer may provide the NLP system 120 with data representing a type(s) of user-specific information needed by the skill system 125 for the skill system 125 to be able to generate a skill system user profile. When approving the skill system 125 for runtime processing of natural language inputs, the NLP system 120 may generate a copy of skill system manifest for the skill system 125. A skill system manifest may include a skill system identifier associated with, among other things, data representing a type(s) of user-specific information needed by the skill system 125 for the skill system 125 to be able to generate a skill system user profile. In at least some examples, determining the user-specific information type(s) may include the profile linking component 275 querying a skill system manifest storage for a user-specific information type(s) associated with the skill system identifier (received at step 310). In response, the profile linking component 275 may receive query results representing the type(s) of user-specific information needed by the skill system 125 to generate a skill system user profile.

The profile linking component 275 may query (330) the NLP profile storage 270 for user-specific information, corresponding to the user-specific information type(s) needed by the skill system 125 to generate a skill system user profile, represented in a NLP user profile corresponding to the user identifier received at step 310. In response, the profile linking component 275 may receive (332) query results including user-specific information represented in the NLP user profile and corresponding to the type(s) of user-specific information needed by the skill system 125.

The profile linking component 275 may also query the NLP profile storage 270 for information representing the NLP user profile includes data representing the user has already provided permission to send the user-specific information to the skill system 125 (if not all skill systems enabled with respect to the NLP user profile). In at least some examples, the profile linking component 275 may receive "no results" query results representing no such data is represented in the NLP user profile. In response to receiving such query results, the profile linking component 275 may send (334), to the orchestrator component 230, data requesting user permission to send the user-specific information to the skill system 125.

The orchestrator component 230 may send (336), to the device 110, data requesting user permission to send the user-specific information to the skill system 125. The data sent by the orchestrator component 230 to the device 110 may be the data the orchestrator component 230 received from the profile linking component 275, or may be a representation of the data received from the profile linking component 275. For example, a representation may be TTS component output audio data (e.g., synthesized speech) representing text data the orchestrator component 230 received from the profile linking component 275.

The device 110 may output (338) the data requesting user permission to send the user-specific information to the skill system 125. In response, the device 110 may receive (340) a user input and send (342), to the orchestrator component 230, data representing the user input. In at least some examples, the user input may be a spoken natural language input, in which examples the data sent to the orchestrator component 230 may be audio data. In at least some examples, the user input may be a typed natural language input, in which examples the data sent to the orchestrator component 230 may be text data. In at least some examples, the user input may be the selection of a button presented on a display of the device 110, in which examples the data sent to the orchestrator component 230 may be text data representing the selected button. In at least some examples, the user input may be a gesture (e.g., such as the user shaking their head yes or no), in which examples the data sent to the orchestrator component 230 may be video data corresponding to images consecutively captured by a camera associated with the device 110.

The orchestrator component 230 may determine (344) the user input represents user permission to send the user-specific information to the skill system 125. Such determination may depend on the data the orchestrator received from the device 110 at step 342. For example, if the orchestrator component 230 receives audio data at step 150, the orchestrator component 230 may send the audio data to the ASR component 250. The ASR component 250 may generate text data representing the audio data and may send the text data to the orchestrator component 230. The orchestrator component 230 may send the text data to the NLU component 260. The NLU component 260 may generate NLU results data representing the text data and may send the NLU results data to the orchestrator component 230. For further example, if the orchestrator component 230 receives text data at step 150, the orchestrator component 230 may send the text data to the NLU component 260. The NLU component 260 may generate NLU results data representing the text data and may send the NLU results data to the orchestrator component 230. In another example, if the orchestrator component 230 receives audio data at step 150, the orchestrator component 230 may send the audio data to an SLU component. The SLU component may generate NLU results data representing the natural language input in the audio data and may send the NLU results data to the orchestrator component 230. The orchestrator component 230, in the foregoing examples, may determine the NLU results data represents user permission to send the user-specific information to the skill system 125. In another example, if the orchestrator component 230 receives video data at step 342, the orchestrator component 230 (or another component of the NLP system 120) may perform machine vision processing to determine the gesture, and determine the gesture corresponds to a user input representing user permission to send the user-specific information to the skill system 125. After the orchestrator component 230 determines the user input represents user permission to send the user-specific information to the skill system 125, the orchestrator component 230 may send (346), to the profile linking component 275, data representing the user permission to send the user-specific information to the skill system 125.

In at least some examples, the profile linking component 275 may determine the user-specific information, stored in the NLP user profile and received at step 332, corresponds to only a subset of the types of user-specific information needed by the skill system 125 to generate a skill system user profile. In such examples, the profile linking component 275 may cause the orchestrator component 230 to send, to the device 110, data requesting further user-specific information corresponding to one or more types of user-specific information needed by the skill system 125 but that is not included in the NLP user profile stored in the NLP profile storage 270. The device 110 may output the data and receive one or more user inputs including the further needed user-specific information. The one or more user inputs may include one or more spoken natural language inputs, one or more typed natural language inputs, and/or one or more other types of user inputs.

In at least some examples, the user recognition component 295 may be invoked with respect to the user input representing the user does not have a skill system user profile stored by the skill system 125, the user input representing the user permission to send the user-specific information to the skill system 125, and/or the user input(s) including the further needed user-specific information. The user recognition component 295 may be invoked with respect to one or more of these user inputs to ensure the user providing the user input(s) has permission to provide such inputs (e.g., is the user corresponding to the NLP user profile stored by the NLP profile storage 270 and with respect to which user-specific information is being gathered). In at least some examples, the user recognition component 295 may perform single-factor user recognition. In at least some other examples, the user recognition component 295 may perform multi-factor user recognition. For example, single-factor user recognition may be sufficient for purposes of a user invoking a skill system, but granting permission to link user profiles and other sensitive operations may require multi-factor user recognition.

After obtaining all user-specific information needed for the skill system 125 to generate a skill system user profile, and after receiving the user permission to send the user-specific information to the skill system 125, receiving the data representing the user does not have a skill system user profile stored by the skill system 125, the profile linking component 275 may send (348), to a skill system 125 (corresponding to the skill system identifier received at step 310), data representing a skill system user profile is to be generated using the user-specific information (received from the NLP user profile stored in the NLP profile storage 270, and optionally including additional user-specific information received from the user).

The skill system 125 may generate (350) a skill system user profile using the user-specific information. The skill system 125 may also generate (352) a skill system user profile token. The skill system user profile token may, in at least some examples, not directly correspond to the skill system user profile generated by the skill system 125. In other words, the skill system 125 may determine the skill system user profile by decoding the skill system user profile token, but the skill system user profile token may not be the identifier used by the skill system 125 to track processing performed with respect to the skill system user profile.

The skill system 125 may send (354) the skill system user profile token to the profile linking component 275. The profile linking component 275 may send (356), to the NLP profile storage 270, data representing the skill system user profile token is to be associated with the skill system identifier in the NLP user profile corresponding to the user identifier received at step 310. This may result in the NLP user profile, stored in the NLP profile storage 270 for the user corresponding to the user identifier, to be linked with the newly generated skill system user profile stored by the skill system 125 for the same user.

While FIGS. 3A through 3F describe the skill system user profile, stored by the skill system 125, being associated with a NLP user profile stored in the NLP profile storage 270, the present disclosure is not limited thereto. For example, the processing performed with respect to FIGS. 3A through 3F may be performed with respect to a skill system user profile, stored by a skill system 125, being associated with a group profile stored in the NLP profile storage 270. For further example, the processing performed with respect to FIGS. 3A through 3F may be performed with respect to a skill system user profile, stored by a skill system 125, being associated with a device profile stored in the NLP profile storage 270.

In at least some examples, rather than the profile linking component 275 sending, to the skill system 125, data representing a skill system user profile is to be generated using the user-specific information at step 348, the profile linking component 275 may send, to the skill system 125, a token corresponding to a NLP user profile. The skill system 125 may send the token to the NLP profile storage 270 without using the profile linking component 275 as an intermediary. In such examples, the NLP profile storage 270 may confirm the token corresponds to the correct user and then send the user-specific information (needed by the skill system 125 to generate a skill system user profile) to the skill system 125. The process may then continue at step 350 of FIG. 3F.

Figure 4A:
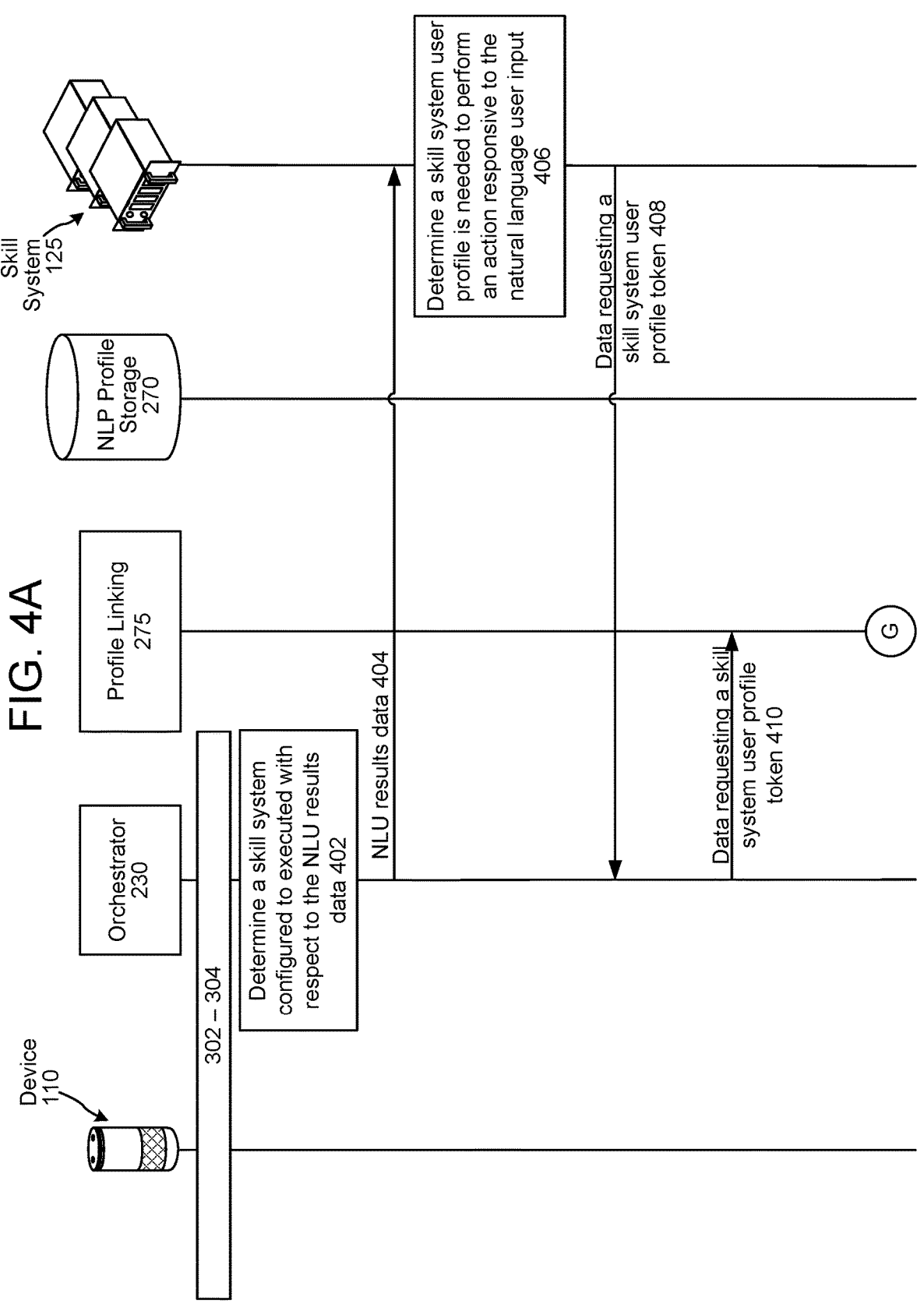
FIGS. 4A and 4B are a signal flow diagram illustrating that a skill system may generate a skill system user profile, and the skill system user profile may be linked to a NLP user profile stored by a NLP system, when the skill system instructs the NLP system to link user profiles, in accordance with embodiments of the present disclosure.
Figure 4B:
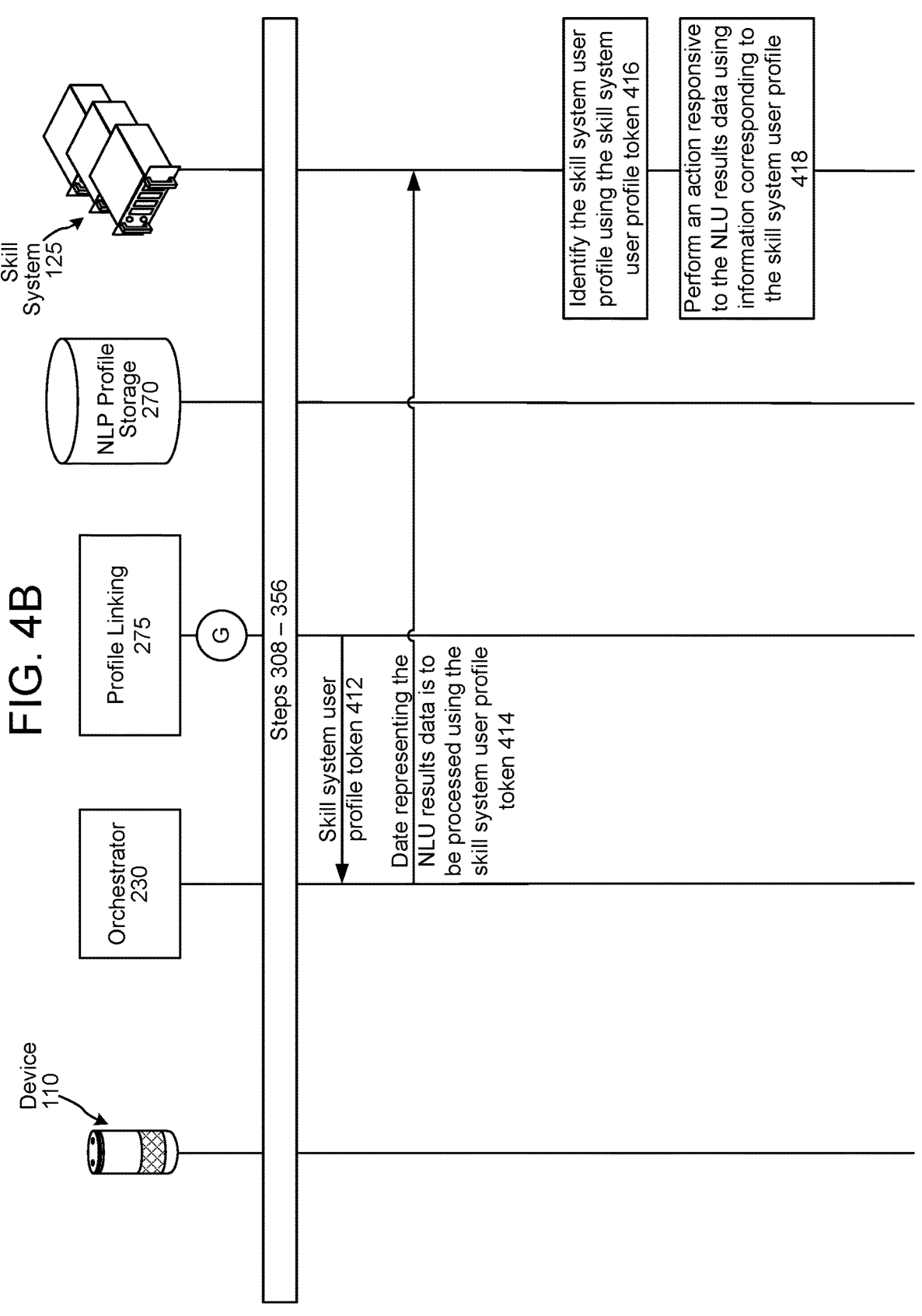

In at least some examples, rather than determining whether a user has a skill system user profile (stored by a skill system 125) when the user provides a user input to enable a skill system 125, the NLP system 120 may perform such processing in response to a skill system 125 instructing the NLP system 120 to perform such processing (as illustrated in FIGS. 4A and 4B).

The process may begin with steps 302 through 304 as described above with respect to FIG. 3A. After receiving the NLU results data, the orchestrator component 230 may determine (402) a skill system 125 configured to execute with respect to the NLU results data. The orchestrator component 230 may send (404) the NLU results data to the skill system 125.

The skill system 125 may determine (406) a skill system user profile, stored by the skill system 125, is needed to perform an action responsive to the natural language input. The skill system 125 may send (408), to the orchestrator component 230, data requesting a skill system user profile token corresponding to a user profile stored by the skill system 125. The orchestrator component 230 may send (410), to the profile linking component 275, data requesting a skill system user profile token corresponding to the skill system 125.

The process may then continue with steps 308 through 356 described above. After the profile linking component 275 receives the skill system user profile token from the skill system 125, the profile linking component 275 may send (412) the skill system user profile token to the orchestrator component 230. The orchestrator component 230 may send (414), to the skill system 125, data representing the NLU results data (sent to the skill system 125 at step 404) is to be processed using the skill system user profile token.

The skill system 125 may identify (416) the skill system user profile, stored by the skill system 125, using the skill system user profile token. The skill system 125 may thereafter perform (418) an action responsive to the NLU results data using information corresponding to the skill system user profile.

In at least some examples, the skill system 125 may include, in the data sent to the orchestrator component 230 at step 408, a type(s) of user-specific information the skill system 125 wants in order to generate a skill system user profile. In such examples, the orchestrator component 230 may send the received desired user-specific information type(s) to the profile linking component 275. Prior to querying the NLP profile storage 270 for user-specific information corresponding to the user-specific information type(s), the profile linking component 275 may confirm that the user-specific information type(s), provided by the skill system 125 at step 408, matches the user-specific information type(s) represented in the skill system's manifest. If the user-specific information does not match, the profile linking component 275 may cease processing, thereby preventing the skill system 125 from gaining access to user-specific information that was not known to the NLP system 120, when the skill system 125 was approved for runtime processing of natural language inputs, as being needed by the skill system 125 to generate a skill system user profile. If, instead, the profile linking component 275 determines the user-specific information type(s) matches, the profile linking component may continue processing at step 330.

Figure 5A:
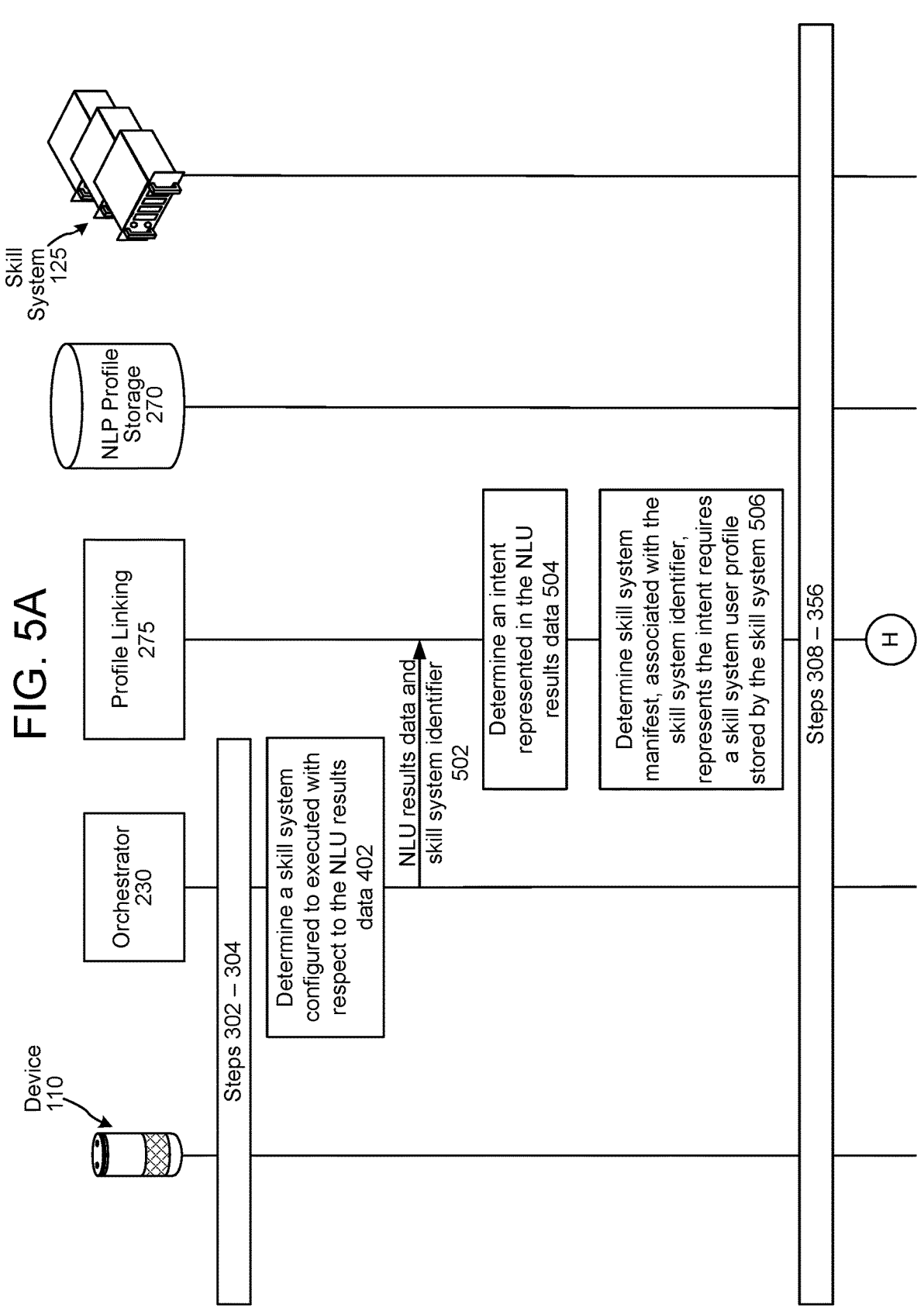
FIGS. 5A and 5B are a signal flow diagram illustrating that a skill system may generate a skill system user profile, and the skill system user profile may be linked to a NLP user profile stored by a NLP system, when a user provides a natural language input corresponding to a particular natural language understanding (NLU) intent, in accordance with embodiments of the present disclosure.
Figure 5B:
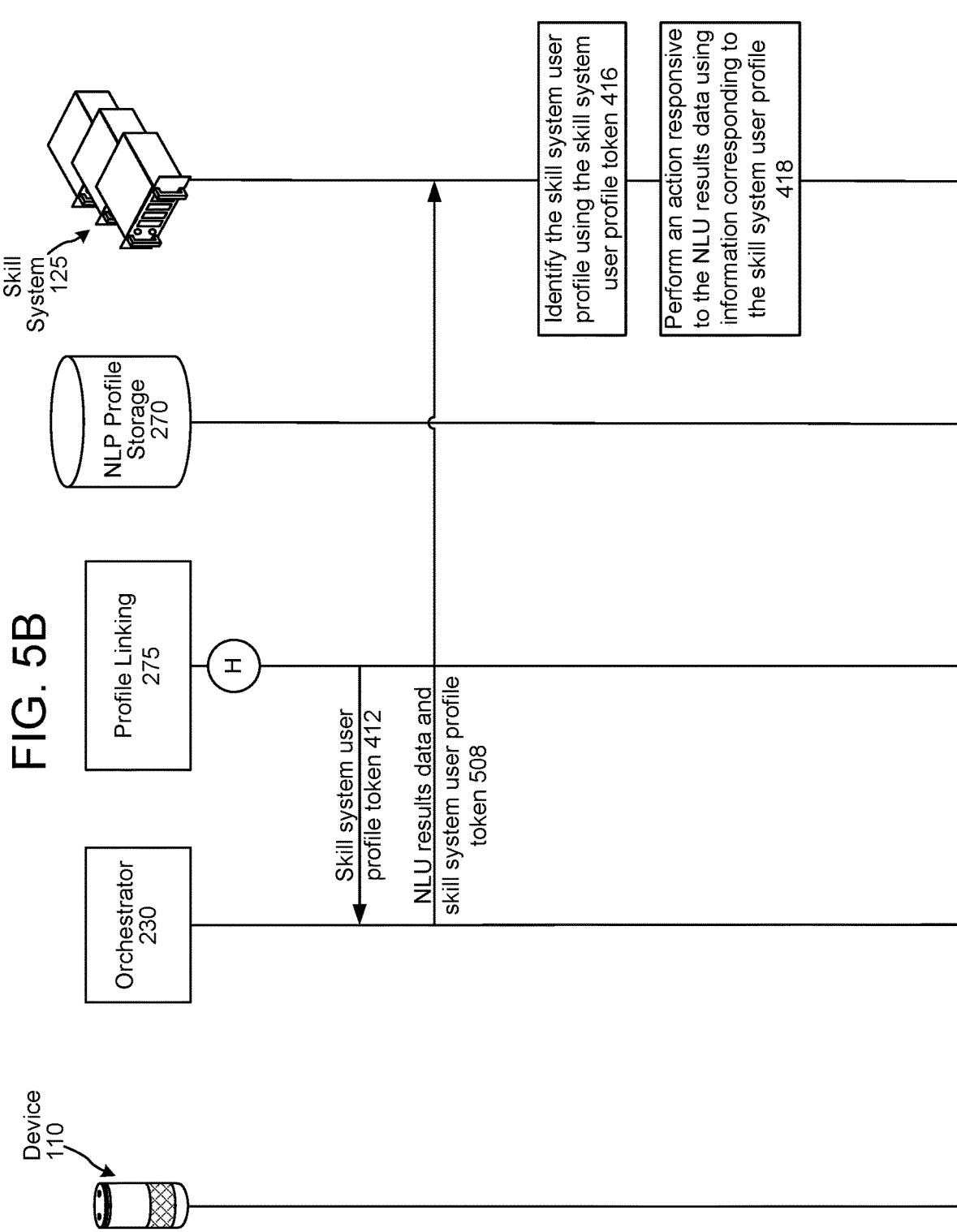

In at least some examples, rather than determining whether a user has a skill system user profile (stored by a skill system 125) when the user provides a user input to enable a skill system 125 (as described with respect to FIGS. 3A through 3F), and rather than receiving an instruction from a skill system 125 to link user profiles (as described with respect to FIGS. 4A and 4B), the NLP system 120 may determine whether a user has a skill system user profile (stored by a skill system 125) based on a NLU intent of a natural language input (as illustrated in FIGS. 5A and 5B).

The process may begin with steps 302 through 304 as described above with respect to FIG. 3A. After receiving the NLU results data, the orchestrator component 230 may determine (402) a skill system 125 configured to execute with respect to the NLU results data. The orchestrator component 230 may send (502) the NLU results data and a skill system identifier (corresponding to the skill system 125) to the profile linking component 275. In at least some examples, the orchestrator component 230 may send the NLU results data and the skill system identifier to the profile linking component 275 in a single data packet. In at least some other examples, the orchestrator component 230 may send the NLU results data and the skill system identifier to the profile linking component 275 separately (e.g., in different data packets).

The profile linking component 275 may determine (504) an intent represented in the NLU results data. The profile linking component 275 may thereafter determine (506) a skill system manifest, associated with the skill system identifier, represents a skill system user profile, stored by the skill system 125, is required for the skill system 125 to process with respect to the intent. After determining such, steps 308 through 356 may be performed as described with respect to FIGS. 3A through 3F above.

After the profile linking component 275 receives the skill system user profile token from the skill system 125, the profile linking component 275 may send (412) the skill system user profile token to the orchestrator component 230. The orchestrator component 230 may send (508), to the skill system 125, the NLU results data and the skill system user profile token. In at least some examples, the orchestrator component 230 may send the NLU results data and the skill system user profile token to the skill system 125 in a single data transmission. In at least some other examples, the orchestrator component 230 may send the NLU results data and the skill system user profile token to the skill system 125 in separate data transmissions.

The skill system 125 may identify (416) the skill system user profile, stored by the skill system 125, using the skill system user profile token. The skill system 125 may thereafter perform (418) an action responsive to the NLU results data using information corresponding to the skill system user profile.

In at least some examples, after a NLP user profile, stored in the NLP profile storage 270, is linked to a skill system user profile stored by a skill system 125 (e.g., a skill system user profile token corresponding to the skill system user profile stored by the skill system 125 is associated with a skill system identifier in the NLP user profile stored in the NLP profile storage 270), the skill system 125 may require a password be configured for the skill system user profile in order for functionality of the skill system 125 to be accessible to the user outside of through the NLP system 120 (e.g., via a mobile application, website, etc.). A password may be configured in a variety of manners.

In at least some examples, the user-specific information sent to the skill system 125 (to enable the skill system 125 to generate a skill system user profile) may include an email address. In such examples, the skill system 125 may send, to the email address, an email with a temporary password. Thereafter, when the user logins in to their skill system user profile (stored by the skill system 125), the user may be requested to update their password. Alternatively, the email, send from the skill system 125 to the email address, may include a "reset password" link. Upon the user selecting the reset password link, the user may be presented with a landing page of a website or application (depending on if the user is using a web browser of application install on a mobile device, respectively). The landing page may require the user to provide a new password that may be used to log in to the user's profile thereafter.

In at least some other examples, the user-specific information sent to the skill system 125 (to enable the skill system 125 to generate a skill system user profile) may include an email address and/or phone number. In such examples, the skill system 125 may send a one-time password to the user via an email and/or text message. Upon the user logging in to their skill system user profile using the one-time password, the user may be requested to update their password to one which may be used to log in to the user's profile thereafter.

In at least some other examples, the skill system 125 may send, to a password manager component (which may be implemented as party of the NLP system 120 or separately from but in communication with the NLP system 120), a request for a temporary password to be sent to the user. The password manager component may generate a random temporary password, and cause the temporary password to be presented to the user via an application that is associated with the NLP system 120 and installed on a mobile device of the user. An example of such an application is the Amazon Alexa application that may be installed on a smart phone, tablet, or the like. Upon the user logging in to their skill system user profile (e.g., on a mobile application or website) using the temporary password, the user may be requested to update their password to one which may be used to log in to the user's profile thereafter.

In at least some examples, the skill system 125 may use the user recognition component 295 as an alternative to the user having to establish a password for the user's profile stored by the skill system 125. For example, when the user attempts to log in to their skill system user profile (e.g., by providing an email address, phone number etc.) using a webpage or application associated with the skill system 125, the skill system 125 may send, to the orchestrator component 230, the user-specific information (e.g., email address, phone number, etc.) being used to access the skill system user profile, as well as data requesting the user being recognized using the user recognition component 295. The orchestrator component 230 may cause the webpage or application to present content (e.g., display text, an image, etc.) instructing the user to interact with their device 110 for purposes of being recognized. Data, representing the user's interaction with the device 110, may be sent to the user recognition component 295. The user recognition component 295 may perform single-factor or multi-factor recognition. Once the user recognition component 295 has recognized the user, the user recognition component 295 may output a user identifier (corresponding to the user) to the orchestrator component 230. The orchestrator component 230 may determine whether the user identifier corresponds to a user or group profile (stored in the NLP profile storage 270) associated with the user-specific information (e.g., email address, phone number, etc.) received from the skill system 125. If the orchestrator component 230 determines the user identifier corresponds to the profile associated with the user-specific information, the orchestrator component 230 may send, to the skill system 125, data representing the user has been recognized. In response to receiving such data, the skill system 125 may cause the webpage or application to provide the user with full access to their skill system user profile and skill system functionality.

The foregoing illustrates various examples for linking NLP system-stored and skill system-stored profiles when a user has an existing NLP system-stored profile but not a skill system-stored profile. In at least some examples, a user may create a profile, specific to a skill system 125, using a NLP system. For example, the NLP system 120 may generate a user profile token representing the user and, each time the user provides a natural language input corresponding to the skill system 125, the NLP system 120 may send a representation of the natural language input and the token to the skill system 125. The skill system 125 may then use the token to perform an action responsive to the natural language input. However, the user may not have a skill system user profile. For example, the user may not be able to log in to a webpage or application (installed on a mobile computing device) corresponding to the skill system 125. The following describes examples for the NLP system 120 to push a user profile token, stored by the NLP system 120, to a skill system 125 for the purpose of the skill system 125 generating a skill system user profile to be stored thereby.

With respect to FIG. 6, a device 110 may have installed thereon an application associated with the NLP system 120. An example of such an application is the Amazon Alexa application that may be installed on a smart phone, tablet, or the like. The device 110 may also have installed thereon an application associated with a skill system 125. The device 110 may present (602) a user profile generation page of the application corresponding to the skill system 125. The user profile generation page may present a link, virtual button, or some other user-selectable graphical element that enables a user to indicate the user profile token, stored by the NLP system 120 is to be used by the skill system 125 to generate a skill system user profile for the user.

While presenting the user profile generation page of the application corresponding to the skill system 125, the device 110 may detect (604) a touch input (e.g., on a touchscreen display of the device 110) representing a user profile token, stored by the NLP system 120, is to be used by the skill system 125 to generate a skill system user profile for the user.

In response to detecting the touch input, the device 110 may receive (606), from the application associated with the skill system 125, data requesting the device 110 open an authorization page of a website corresponding to the NLP system 120. As used herein, an "authorization page" may refer to a webpage through which a user may input user profile login credentials and/or provide authorization for the NLP system 120 to send a user profile token (representing the user's profile stored by the NLP system 120 for the skill system 125) to the skill system 125.

After receiving the data requesting the authorization webpage be opened, the device 110 may determine (608) an application, associated with the NLP system 120, is installed on the device 110. In at least some examples, the data, requesting the authorization webpage be opened, may include a name corresponding to the NLP system 120. In such examples, the device 110 may identify the name of the NLP system 120 in the data requesting the authorization webpage be opened, and may determine an application, installed on the device 110, corresponding to the NLP system 120's name.

After determining the application, associated with the NLP system 120, is installed on the device, the device 110 may determine (610) the application, associated with the NLP system 120, is associated with an indicator representing permission for an authorization page of the application to be presented in response to the data requesting the authorization webpage be opened. For devices implementing an iOS operating system, such permission and device 110 processing may be implemented using universal links. For devices implementing an Android operating system, such permission and device 110 processing may be implemented using Android App Links.

Thereafter, the device 110 may present (612) the authorization page of the application associated with the NLP system 120. While the authorization page is presented, the device 110 may detect (614) a touch input (e.g., on a touchscreen display of the device 110) representing the NLP system 120 is permitted to send a user profile token, corresponding to the skill system 125, to the skill system 125. In at least some examples, such a touch input may correspond to a user selection of a displayed "Authorize" button. After the device 110 detects the touch input representing the NLP system 120 is permitted to send a user profile token to the skill system 125, the device 110 may close (616) the application, associated with the NLP system 120, and again present (618) the application associated with the skill system 125.

After the device 110 detects the touch input representing the NLP system 120 is permitted to send a user profile token to the skill system 125, the device 110 may receive (620), from the NLP system 120, a first user profile token associated with the skill system 125 in the user's NLP user profile stored by the NLP system 120. For example, the NLP system 120 may determine a user profile associated with the device 110 and/or login credentials presently logged in to the NLP system 120's application installed on the device 110. The NLP system 120 may determine a first user profile token associated with the skill system 125 in the NLP user profile.

The device 110 may thereafter send (622), the first user profile token to the application associated with the skill system 125. In response to receiving the first user profile token, the application, associated with the skill system 125, may send the first user profile token to the skill system 125. The skill system 125 may generate a skill system user profile based on the user profile tokenNLP profile storage. NLP profile storageAt least one benefit of the processing described with respect to FIG. 6 is that a user may create a user profile, for a skill system 125, using a NLP system 120 and thereafter permit the skill system 125 to use the already created user profile to generate a skill system-stored user profile for the user.

One skilled in the art will appreciate that the processing, described from the device 110 perspective with respect to FIG. 6, may be applied similarly in a situation where the user is logged in to a webpage associated with the skill system 125, rather than an application associated with the skill system 125.

Figure 7:
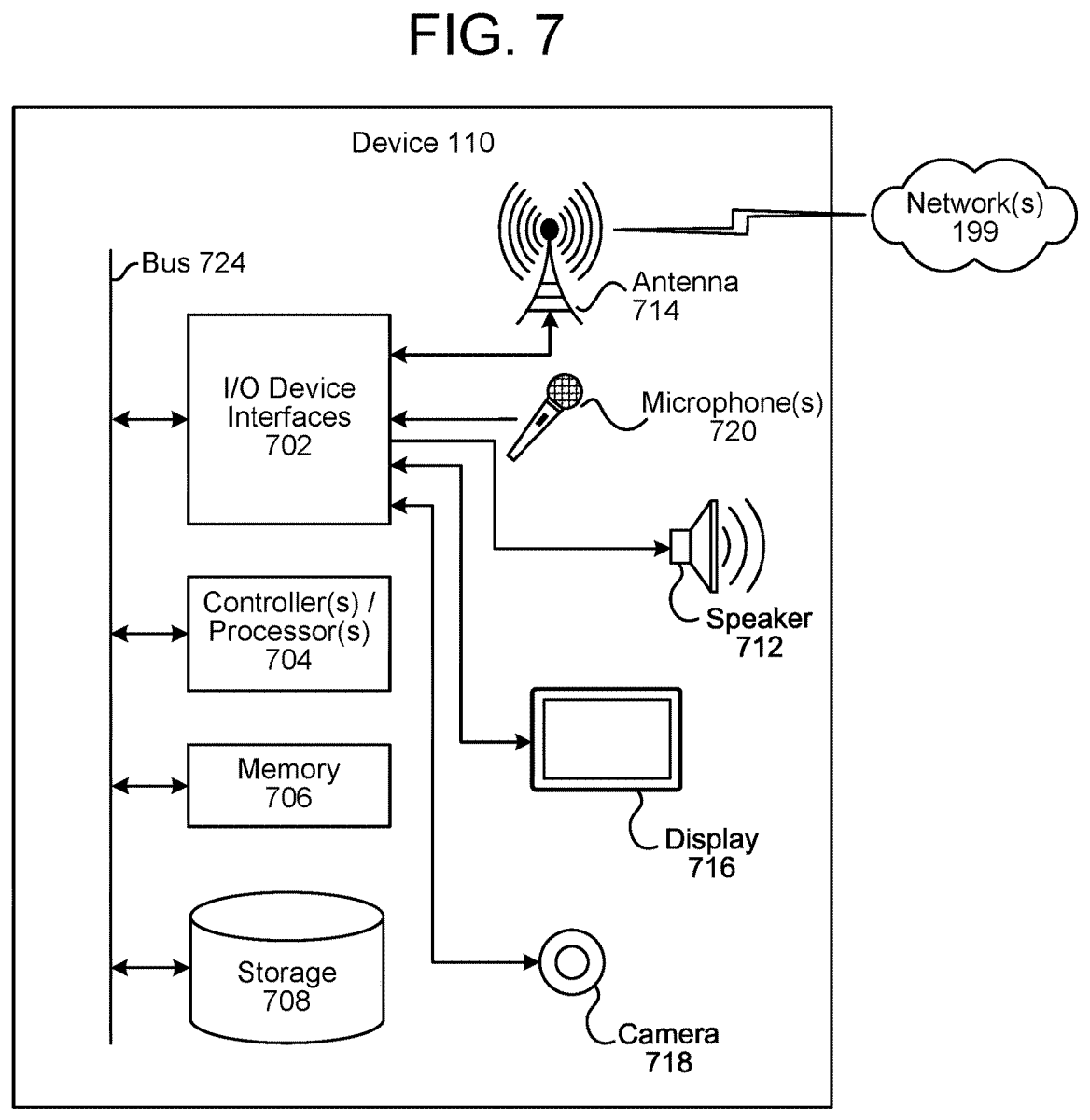
Figure 8:
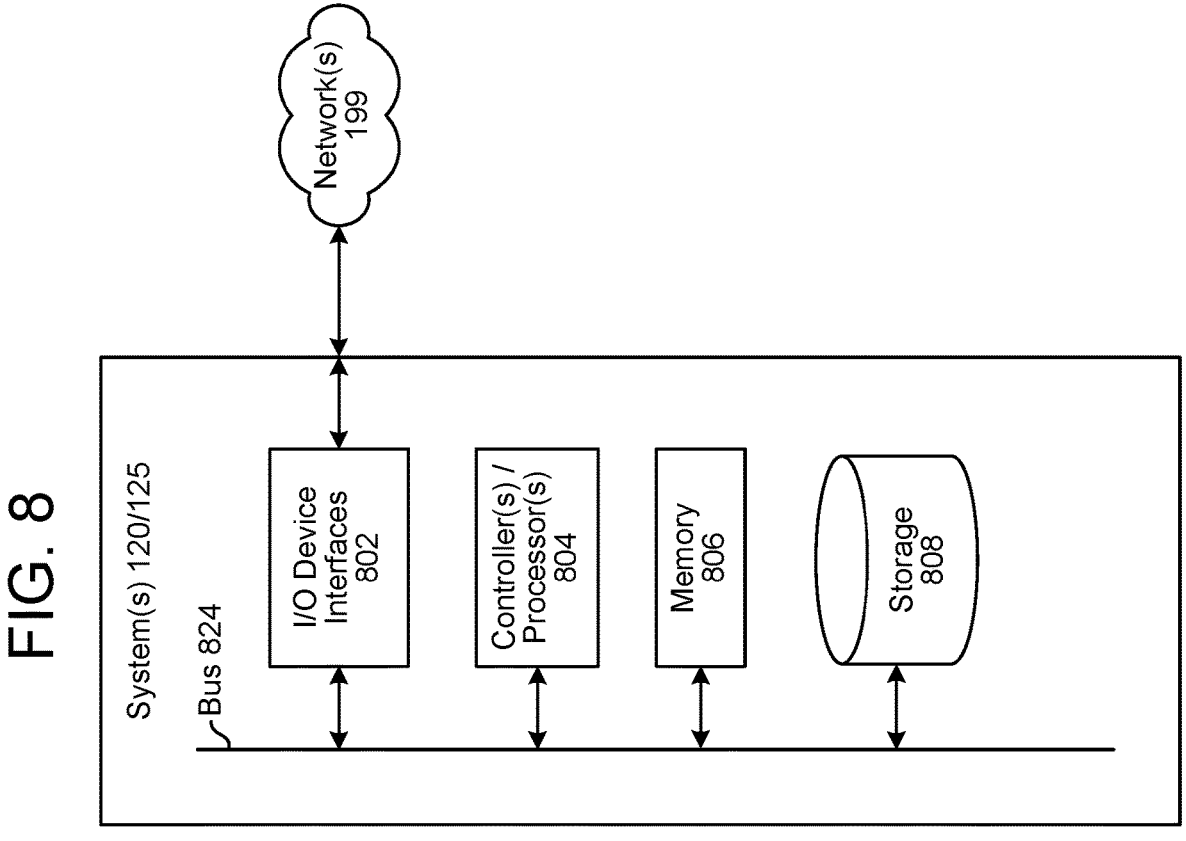
FIG. 8 is a block diagram conceptually illustrating example components of a system, in accordance with embodiments of the present disclosure.

FIG. 7 is a block diagram conceptually illustrating a device 110/112 that may be used with the system. FIG. 8 is a block diagram conceptually illustrating example components of a remote device, such as the NLP system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more NLP systems 120 for performing ASR processing, one or more NLP systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 714, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the NLP system 120, or a skill system 125 may include their own dedicated processors, memory, and/or storage. Alternatively, one or more of the components of the device(s) 110, the NLP system 120, or a skill system 125 may utilize the I/O interfaces (702/802), processor(s) (704/804), memory (706/806), and/or storage (708/808) of the device(s) 110, NLP system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the NLP system 120, and a skill system 125, as described herein, are illustrative, and may be located as a stand-alone device or may be included, in whole or in part, as a component of a larger device or system.

Figure 9:
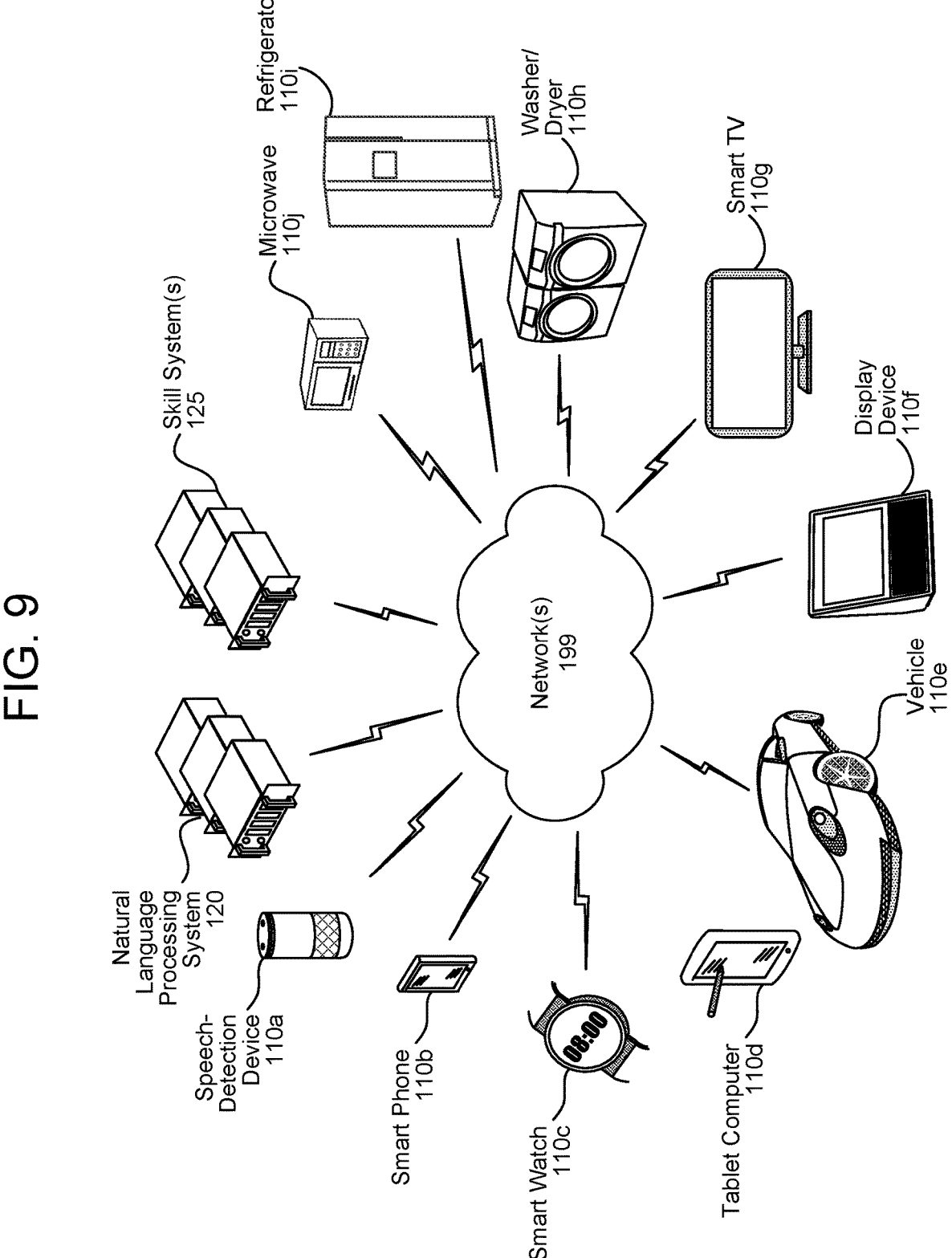
FIG. 9 illustrates an example of a computer network for use with the overall system, in accordance with embodiments of the present disclosure.

As illustrated in FIG. 9, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the NLP system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the NLP system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a first device associated with a first user profile, a request corresponding to generation of a second user profile for a website;
determining a first type of information is to be used to generate the second user profile;
determining user permission to use first information to generate the second user profile, the first information corresponding to the first type of information;
based on the user permission, sending the first information to a component corresponding to the website, wherein sending of the first information enables the component to generate the second user profile using the first information;
after sending the first information, receiving, from the component corresponding to the website, first data corresponding to a token associated with the second user profile as generated by the component corresponding to the website, wherein the token is an identifier of the second user profile stored by the website, the token being unique to a system that generated the token;
storing an association between the first data and the first user profile, wherein the first user profile is associated with the first device and is different from the second user profile associated with the website;
receiving, from the first device, a second request relating to the website;
based at least in part on the second request relating to the website and the second request being received from the first device, selecting the first data associated with the first user profile; and
causing the component corresponding to the website to perform an action response to the second request based on the first data.

2. The computer-implemented method of claim 1, wherein the first user profile and the second user profile are associated with a same user.

3. The computer-implemented method of claim 1, further comprising:
receiving user input data from the first device, the user input data representing a natural language input; and
processing the user input data to determine the request.

4. The computer-implemented method of claim 1, further comprising:
retrieving, using the first user profile, the first information.

5. The computer-implemented method of claim 1, wherein the first user profile corresponds to a first system, and the website is different from the first system.

6. The computer-implemented method of claim 1, wherein the first information is specific to a user associated with the first user profile.

7. The computer-implemented method of claim 1, further comprising:
associating the second user profile with the first device.

8. The computer-implemented method of claim 1, wherein the second user profile corresponds to an application to be operated in conjunction with the first device.

9. The computer-implemented method of claim 1, further comprising:
determining that a user associated with the first user profile has been recognized using a user recognition technique; and
sending the first information based on determining that the user has been recognized.

10. The computer-implemented method of claim 1, wherein the first data is the token that, when decoded by the component corresponding to the website, identifies the second user profile.

11. The computer-implemented method of claim 1, further comprising:
determining an identifier that supports an association between the first user profile and the website; and
determining, based at least in part on the identifier, the first type of information.

12. A system comprising:

at least one processor; and at least one memory comprising instructions that, when executed by the at least one processor, cause the system to:

receive, from a first device associated with a first user profile, a request corresponding to generation of a second user profile for an application;

determine a first type of information is to be used to generate the second user profile;

determine user permission to use first information to generate the second user profile, the first information corresponding to the first type of information;

based on the user permission, send the first information to a component corresponding to the application, wherein sending of the first information enables the component to generate the second user profile using the first information;

after sending the first information, receive, from the component corresponding to the application, first data corresponding to a token associated with the second user profile as generated by the component corresponding to the application, wherein the token is an identifier of the second user profile stored by the application;

store an association between the first data and the first user profile, wherein the first user profile is associated with the first device and is different from the second user profile associated with the application;

receive, from the first device, a second request relating to the application;

based at least in part on the second request relating to the application and the second request being received from the first device, selecting the first data associated with the first user profile; and causing the component corresponding to the application to perform an action response to the second request based on the first data.

13. The system of claim 12, wherein the first user profile and the second user profile are associated with a same user.

14. The system of claim 12, wherein the at least one memory further comprises instructions that, when executed by the at least one processor, further cause the system to:

receive user input data from the first device, the user input data representing a natural language input; and process the user input data to determine the request.

15. The system of claim 12, wherein the at least one memory further comprises instructions that, when executed by the at least one processor, further cause the system to:

retrieve, using the first user profile, the first information.

16. The system of claim 12, wherein the first user profile corresponds to a first system, and the application is different from the first system.

17. The system of claim 12, wherein the first information is specific to a user associated with the first user profile.

18. The system of claim 12, wherein the at least one memory further comprises instructions that, when executed by the at least one processor, further cause the system to:

associate the second user profile with the first device.

19. The system of claim 12, wherein the second user profile corresponds to a website.

20. The system of claim 12, wherein the at least one memory further comprises instructions that, when executed by the at least one processor, further cause the system to:

determine that a user associated with the first user profile has been recognized using a user recognition technique; and send the first information based on determining that the user has been recognized.

* * * * *